United States Patent
Takikawa et al.

(10) Patent No.: US 10,996,844 B2
(45) Date of Patent: May 4, 2021

(54) PROGRAM, METHOD, AND DEVICE FOR CONTROLLING APPLICATION, AND RECORDING MEDIUM

(71) Applicant: HONDA MOTOR CO., LTD., Tokyo (JP)

(72) Inventors: Keiichi Takikawa, Tokyo (JP); Akira Iihoshi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 684 days.

(21) Appl. No.: 14/897,508

(22) PCT Filed: Jun. 5, 2014

(86) PCT No.: PCT/JP2014/064955
§ 371 (c)(1),
(2) Date: Dec. 10, 2015

(87) PCT Pub. No.: WO2014/199893
PCT Pub. Date: Dec. 18, 2014

(65) Prior Publication Data
US 2016/0139798 A1 May 19, 2016

(30) Foreign Application Priority Data

Jun. 12, 2013 (JP) .............................. JP2013-123673
Jun. 12, 2013 (JP) .............................. JP2013-123674
Dec. 13, 2013 (JP) .............................. JP2013-257684

(51) Int. Cl.
*G06F 3/0488* (2013.01)
*G01C 21/26* (2006.01)
(Continued)

(52) U.S. Cl.
CPC ......... *G06F 3/04883* (2013.01); *G01C 21/26* (2013.01); *G06F 3/0482* (2013.01);
(Continued)

(58) Field of Classification Search
CPC .. G06F 3/0482; G06F 3/04842; G06F 3/0488; G06F 3/04883; G06F 3/04845
See application file for complete search history.

(56) References Cited

U.S. PATENT DOCUMENTS

| | | | |
|---|---|---|---|
| 9,013,422 B2 | 4/2015 | Miyaji | |
| 9,014,980 B2 | 4/2015 | Itou et al. | |

(Continued)

FOREIGN PATENT DOCUMENTS

| | | |
|---|---|---|
| CN | 103241187 | 8/2013 |
| JP | 08-055298 | 2/1996 |

(Continued)

OTHER PUBLICATIONS

Notification of Reasons for Refusal, Application No. Patent Application No. 2013-123673, Date of Drafting: Dec. 22, 2014, English translation included.

(Continued)

*Primary Examiner* — Christopher E Leiby
(74) *Attorney, Agent, or Firm* — Rankin, Hill & Clark LLP

(57) ABSTRACT

The purpose of the present invention is to control an information terminal, equipped with a touch panel and installed in a vehicle, in a manner in which it can be operated without affecting driving. A drive mode application causes an information terminal, controlling the running of an application through first control on the basis of a user operation received via a touch panel, to function as: a connection detection unit, which detects a connection to a vehicle; a function limiting unit, which controls the running of the application through second control, different from the first control, on the condition that the connection to the vehicle is detected; and a display switching unit, which, on the basis of a sliding operation in a first direction received via the (Continued)

touch panel while a first application is being displayed, displays the first application and a second application.

15 Claims, 15 Drawing Sheets

(51) Int. Cl.
    *G06F 3/0482* (2013.01)
    *G06F 3/0484* (2013.01)

(52) U.S. Cl.
    CPC ........ *G06F 3/0488* (2013.01); *G06F 3/04842* (2013.01); *G06F 3/04845* (2013.01); *G06F 2203/04803* (2013.01)

(56) References Cited

U.S. PATENT DOCUMENTS

| | | | |
|---|---|---|---|
| 9,094,603 B2* | 7/2015 | Ishihara | H04N 5/2353 |
| 2004/0204840 A1 | 10/2004 | Hashima et al. | |
| 2007/0018955 A1 | 1/2007 | Biersch | |
| 2008/0059902 A1* | 3/2008 | Nakashima | G06F 3/0482 715/783 |
| 2009/0044117 A1* | 2/2009 | Vaughan | G11B 27/034 715/716 |
| 2012/0013562 A1 | 1/2012 | Jyonoshita et al. | |
| 2013/0076659 A1 | 3/2013 | Miyaji | |
| 2013/0135118 A1* | 5/2013 | Ricci | G06F 9/54 340/932.2 |
| 2013/0137489 A1* | 5/2013 | Takikawa | H04W 4/046 455/566 |
| 2013/0141227 A1 | 6/2013 | Murata et al. | |
| 2014/0282208 A1* | 9/2014 | Chaudhri | G06F 3/04883 715/779 |
| 2014/0316703 A1 | 10/2014 | Itou et al. | |
| 2015/0015520 A1* | 1/2015 | Narita | G06F 3/0485 345/173 |
| 2015/0024731 A1 | 1/2015 | Kato et al. | |
| 2017/0339344 A1* | 11/2017 | Ishihara | G06F 3/04845 |

FOREIGN PATENT DOCUMENTS

| | | |
|---|---|---|
| JP | 2003-162731 | 6/2003 |
| JP | 2003-195998 | 7/2003 |
| JP | 2003-222523 | 8/2003 |
| JP | 2006-344241 | 12/2006 |
| JP | 2007-66297 | 3/2007 |
| JP | 2010-66227 | 3/2010 |
| JP | 2010-231463 | 10/2010 |
| JP | 2012-008968 | 1/2012 |
| JP | 2012-43253 | 3/2012 |
| JP | 2012-230437 | 11/2012 |
| JP | 2012-251792 | 12/2012 |
| JP | 2013-084233 | 5/2013 |
| JP | 2013-101435 | 5/2013 |
| JP | 2013-115773 | 6/2013 |
| WO | 2012/036279 | 3/2012 |
| WO | 2012/144138 | 10/2012 |
| WO | 2013/145804 | 10/2013 |

OTHER PUBLICATIONS

International Search Report, dated Sep. 9, 2014 (Sep. 9, 2014).
Japanese Office Action dated Jun. 28, 2016, Application No. 2015-182585.
Chinese Office Action dated Oct. 24, 2016.
Japanese Notification of Reasons for Refusal dated Jan. 24, 2017, 3 pages.
Japanese Notification of Reasons for Refusal dated Feb. 14, 2017, Application No. 2015-084427, 2 pages.

* cited by examiner

PROGRAM, METHOD, AND DEVICE FOR CONTROLLING APPLICATION, AND RECORDING MEDIUM

TECHNICAL FIELD

The present invention relates to a program, a method, and a device for controlling an application in an information terminal connected to a vehicle that is being driven and a recording medium.

BACKGROUND ART

In accordance with the development of information processing technologies in recent years, information terminals each including a touch panel, such as smartphones and tablet terminals, are widely used. In such information terminals, by installing a predetermined program (application), their functions can be easily expanded, and, by installing a so-called car navigation application, the information terminals can also be used as car navigation systems supporting the driving of a vehicle or the like.

In an information terminal such as a smartphone, generally, icons associated with applications are arranged on a home screen, and a user operates an application by selecting such an icon. In addition, the user returns the screen to the home screen by operating a predetermined home button once and operates an icon again, thereby executing switching between applications.

To ensure safety during driving, a mechanism (so-called driver distraction (represented as DD)) prohibiting complicated operations is included in car navigation systems. From this respect, in a case when a smartphone or the like is used as a car navigation system, when an application is operated or switched by the operation of an icon, the line of sight of the driver is diverted toward a display, which is not desirable in terms of safe driving.

Thus, the in-vehicle devices (in-vehicle apparatuses) described in Patent Documents 1 and 2 have been known in recent years as schemes for realizing the prevention of driver distraction. In the in-vehicle device described in Patent Document 1, in a case when an application that is being executed is not permitted to be used during driving in a connected mobile information terminal, a notice or a warning is given to a crew member of the vehicle. In the in-vehicle device described in Patent Document 2, during driving, applications permitted to be used during driving are activated, and applications not permitted to be used are deactivated.

There is a safety problem due to an excessive amount of information being displayed on a car navigation display on the entire rectangular screen and allowing the driver to see the screen while driving a vehicle, and a technology is disclosed in Patent Document 3 in which the display area is configured to have directivity having a fan shape (or an inverted-triangle shape) expanded at a required angle from a current place toward a target place with the current place set as a circular range within a required radius.

Patent Document 1: Japanese Unexamined Patent Application, Publication No. 2012-043253
Patent Document 2: Japanese Unexamined Patent Application, Publication No. 2003-222523
Patent Document 3: Japanese Unexamined Patent Application, Publication No. H08-55298

DISCLOSURE OF THE INVENTION

Problems to be Solved by the Invention

However, in the in-vehicle device disclosed in Patent Document 1, an application that is not permitted to be used can be used by ignoring the notice or the warning, which does not contribute to safe driving. In addition, in the in-vehicle device disclosed in Patent Document 2, there is no change in the method of operating an activated application when the vehicle is not being driven, and accordingly, there is concern that safe driving may be disturbed by an operation executed during driving. The map displaying method disclosed in Patent Document 3 is merely a method for displaying the map of a car navigation application on the fan-shaped display area described above on a display and does not relate to the operation of a different application other than the car navigation application or display switching during driving and does not disclose driver distraction.

The present invention is in consideration of such problems, and an object thereof is to provide a program, a method, a device, and a recording medium having a program recorded thereon controlling an information terminal, which includes a touch panel, mounted in a vehicle to be operated without influencing driving.

Means for Solving the Problems (1) A program (for example, a drive-mode application 1 to be described later) that causes an information terminal (for example, an information terminal 50 to be described later) controlling operations of applications in first control based on a user's operation received through a touch panel (for example, a touch panel 241 to be described later) to function as: a connection detecting unit (for example, a connection detecting unit 111 to be described later) detecting a connection to a vehicle; and a function restricting unit (for example, a function restricting unit 112 to be described later) controlling the operations of the applications in second control other than the first control under a condition that the connection detecting unit detects the connection to the vehicle.

According to the program of (1), the function restricting unit controls the operations of applications in the first control at the normal time when there is no connection to a vehicle and controls the operations of the applications in the second control other than the first control at the time when there is a connection to a vehicle. In this way, operations and the like that are not desirable during the driving of the vehicle can be appropriately prohibited, and the information terminal including the touch panel mounted in the vehicle can be operably controlled without influencing driving.

(2) The program described in (1), wherein the second control restricts some (for example, text inputting) of the user's operations that can be received in the first control and restricts some (for example, reproduction of a moving image) of the applications that can be operated in the first control.

According to the program of (2), an operation (for example, inputting a text) or an application (for example, reproduction of a moving image) requiring watching the display device can be prohibited when there is a connection to a vehicle, and the information terminal including the touch panel mounted on a vehicle can be operably controlled without influencing driving.

(3) The program described in (1) or (2), wherein the program further causes the information terminal to function as a display switching unit (for example, a display switching unit 113 to be described later) that executes switching among kinds of applications to be displayed on a display device (for example, a display 24 to be described later) of the information terminal based on a swiping operation executed in a first direction received through the touch panel.

According to the program of (3), since the display switching unit executes switching among the kinds of applications to be displayed based on the swiping operation executed in the first direction received through the touch panel, the switching among applications can be intuitively executed, and there is no influence on driving.

(4) The program described in (3), wherein the program further causes the information terminal to function: to display a first application (for example, a navigation application 121 to be described later) and a second application (for example, a music application 122 to be described later) on the display device in a case when the swiping operation executed in the first direction is received in a state in which the first application is displayed on the display device; to display the second application on the display device in a case when the swiping operation executed in the first direction is received in a state in which the first application and the second application are displayed on the display device; and to display the first application on the display device in a case when a swiping operation executed in a second direction that is the direction opposite to the first direction is received in the state in which the first application and the second application are displayed on the display device, as the display switching unit.

According to the program of (4), the application is switched from the first application to the second application in accordance with the swiping operation executed in the first direction and is switched from the second application to the first application in accordance with the swiping operation executed in the second direction. Accordingly, the switching to the base application having a high use frequency during driving can be executed intuitively and easily, and change of viewpoint during driving can be suppressed.

(5) A method of controlling applications that is executed by an information terminal (for example, an information terminal 50 to be described later) controlling operations of the applications in first control based on a user's operation received through a touch panel (for example, a touch panel 241 to be described later), the method including: a connection detecting process (for example, a process executed by the information terminal 50 using a connection detecting unit 111 to be described later) detecting a connection to a vehicle; and a function restricting process (for example, a process executed by the information terminal 50 using a function restricting unit 112 to be described later) controlling the operations of the applications in second control other than the first control under the condition that the connection to the vehicle is detected.

(6) The method of controlling applications described in (5), wherein the second control restricts some (for example, text inputting) of the user's operations that can be received in the first control and restricts some (for example, reproduction of a moving image) of the applications that can be operated in the first control.

(7) The method of controlling applications described in (5) or (6), the method further including a display switching process (for example, a process executed by the information terminal 50 using a display switching unit 113 to be described later) executing switching among kinds of applications to be displayed on a display device (for example, a display 24 to be described later) of the information terminal based on a swiping operation executed in a first direction received through the touch panel that is executed by the information terminal.

(8) The method of controlling applications described in (7), wherein the display switching process includes: displaying a first application (for example, a navigation application 121 to be described later) and a second application (for example, a music application 122 to be described later) on the display device in a case when the swiping operation executed in the first direction is received in a state in which the first application is displayed on the display device; displaying the second application on the display device in a case when the swiping operation executed in the first direction is received in a state in which the first application and the second application are displayed on the display device; and displaying the first application on the display device in a case when a swiping operation executed in a second direction that is the direction opposite to the first direction is received in the state in which the first application and the second application are displayed on the display device.

According to the methods of controlling applications of (5) to (8), the same effects as those of the programs (1) to (4) are acquired.

(9) A program (for example, a drive-mode application 1 to be described later) that causes a computer (for example, an information terminal 50 to be described later) controlling operations of applications based on a user's operation received through a touch panel (for example, a touch panel 241 to be described later) to function as: a determination unit (for example, a determination unit 114 to be described later) determining whether the user's operation received through the touch panel is either a single touch or a multi-touch; a display switching unit (for example, a display switching unit 113 to be described later) executing switching among kinds of applications to be displayed on a display device (for example, a display 24 to be described later) of the computer based on a swiping operation received through the touch panel in a case when the single touch is determined by the determination unit; and an AP operating unit (for example, an AP operating unit 115 to be described later) executing an operation of the application displayed on the display device based on the swiping operation received through the touch panel in a case when the multi-touch is determined by the determination unit.

According to the program of (9), the user can execute the switching among applications and operation of the application only by executing an intuitive operation that is a single touch or a multi-touch swiping operation, thus, the user does not need to visually recognize the display device, and can operably control the computer including the touch panel mounted in the vehicle without influencing driving.

(10) The program described in (9), wherein the program further causes the computer to function: to display a first application (for example, a navigation application 121 to be described later) and a second application (for example, a music application 122 to be described later) on the display device in a case when a single touch swiping operation executed in a first direction is received in a state in which the first application is displayed on the display device; to display the second application on the display device in a case when a single touch swiping operation executed in the first direction is received in a state in which the first application and the second application are displayed on the display device; and to display the first application on the display device in a case when a single touch swiping operation executed in a second direction that is the direction opposite to the first direction is received in the state in which the first application and the second application are displayed on the display device, as the display switching unit.

According to the program of (10), the application is switched from the first application to the second application in accordance with the swiping operation executed in the first direction and is switched from the second application to the first application in accordance with the swiping operation executed in the second direction. Accordingly, the switching to the base application having a high use frequency during driving can be executed intuitively and easily, and change of viewpoint during driving can be suppressed.

(11) The program described in (10), wherein the program causes the computer to function to execute an operation for a new application displayed by the display switching unit based on the multi-touch swiping operation in a case when a plurality of the applications are displayed on the display device as the AP operating unit.

According to the program of (11), the user does not need to be aware of the starting position of the swiping operation for operating the application and thus can execute the operation of the application only through an intuitive operation without changing line of sight to the display screen, whereby a change of viewpoint during driving can be suppressed.

(12) A method of controlling applications that is executed by a computer (for example, an information terminal 50 to be described later) controlling operations of the applications based on a user's operation received through a touch panel (for example, a touch panel 241 to be described later), the method including: a determination process (for example, a process executed by the information terminal 50 using a determination unit 114 to be described later) determining whether the user's operation received through the touch panel is either a single touch or a multi-touch; a display switching process (for example, a process executed by the information terminal 50 using a display switching unit 113 to be described later) executing switching among kinds of applications to be displayed on a display device (for example, a display 24 to be described later) of the computer based on a swiping operation received through the touch panel in a case when the single touch is determined; and an AP operating process (for example, a process executed by the information terminal 50 using an AP operating unit 115 to be described later) executing an operation of the application displayed on the display device based on the swiping operation received through the touch panel in a case when the multi-touch is determined.

(13) The method of controlling applications described in (12), wherein the display switching process includes: displaying a first application (for example, a navigation application 121 to be described later) and a second application (for example, a music application 122 to be described later) on the display device in a case when a single touch swiping operation executed in a first direction is received in a state in which the first application is displayed on the display device; displaying the second application on the display device in a case when a single touch swiping operation executed in the first direction is received in a state in which the first application and the second application are displayed on the display device; and displaying the first application on the display device in a case when a single touch swiping operation executed in a second direction that is the direction opposite to the first direction is received in the state in which the first application and the second application are displayed on the display device.

(14) The method of controlling applications described in (13), wherein the AP operating process executes an operation for a new application displayed by the display switching process based on the multi-touch swiping operation in a case when a plurality of the applications are displayed on the display device.

According to the methods of controlling applications of (12) to (14), the same effects as those of the programs of (9) to (11) are acquired.

(15) A program (for example, a drive-mode application 1 to be described later) that causes a computer (for example, an information terminal 50 to be described later) controlling operations of applications based on a user's operation received through a touch panel (for example, a touch panel 241 to be described later) to function as: a determination unit (for example, a determination unit 114 to be described later) determining whether or not the user's operation received through the touch panel is a swiping operation; a function restricting unit (for example, a function restricting unit 112 to be described later) invalidating the user's operation in a case when the operation is determined not to be the swiping operation by the determination unit; and a display switching unit (for example, a display switching unit 113 to be described later) executing switching among kinds of applications to be displayed on a display device (for example, a display 24 to be described later) of the computer based on the swiping operation in a case when the operation is determined to be the swiping operation by the determination unit.

According to the program of (15), operations other than the swiping operation are invalidated, and the switching among applications is executed based on the swiping operation, whereby the switching among applications can be executed by only an intuitive operation. Accordingly, the display device does not need to be visually recognized, and the computer including the touch panel mounted in the vehicle can be operably controlled without influencing driving.

(16) The program described in (15), wherein the program causes the computer to function to validate the swiping operation only in a case when the swiping operation is a swiping operation having a starting point positioned near an edge of the display device as the function restricting unit.

According to the program of (16), the swiping operation is invalidated depending on the starting point of the swiping operation. Generally, since the user can recognize the frame portion by touching it using the hand without visually recognizing the display device, erroneous operation while driving the vehicle can be prevented, whereby change of viewpoint in the display device accompanied with the erroneous operation can be suppressed.

(17) The program described in (15) or (16), wherein the program further causes the computer to function: to determine whether or not the user's operation received through the touch panel is an operation executed in a predetermined area disposed in a part of the touch panel as the determination unit; and to validate the operation regardless of the content of the operation in a case when the user's operation is determined to be an operation executed in the predetermined area by the determination unit and invalidate an operation other than the swiping operation in a case when the user's operation is determined not to be an operation executed in the predetermined area by the determination unit as the function restricting unit.

According to the program of (17), in order to validate operations other than the swiping operation for the predetermined area that is a limited area, it is possible to diversify the contents that can be operated.

(18) A program (for example, a drive-mode application 1 to be described later) causing an information terminal (for example, an information terminal 50 to be described later) controlling operations of applications based on a user's operation received through a touch panel (for example, a touch panel 241 to be described later) mounted on a display device (for example, a display 24 to be described later) to function as: a display switching unit (for example, a display switching unit 113 to be described later) displaying a first application (for example, a navigation application 121 to be described later) and a second application (for example, a music application 122 to be described later) having a curved boundary line on a designated radius from a specific position on the first application on the display device based on a user's first type touch swiping operation (for example, a multi-touch to be described later) executed in a first direction (for example, from the right side to the left side to be described later, from the left side to the right side to be described later, from the upper side to the lower side to be described later, or from the lower side to the upper side to be described later) that is received through the touch panel in a state in which the first application is displayed on the display device.

According to the program of (18), the display switching unit (for example, a display switching unit 113 to be described later) forms the shape of the widget displayed in the second application (for example, a music application 122 to be described later) so as not to block a certain range of a circle from the specific position (for example, the position of the user's own vehicle to be described later) displayed inside the first application (for example, a navigation application 121 to be described later). Accordingly, neighboring information of the certain range from the specific position displayed inside the first application can be constantly acquired by the user.

(19) The program described in (18), wherein the program causes the information terminal to function to display the first application on the entire face of the display device (in a case when a first type touch swiping operation (for example, a multi-touch to be described later) executed in a second direction that is the direction opposite to the first direction (for example, from the right side to the left side to be described later, from the left side to the right side to be described later, from the upper side to the lower side to be described later, or from the lower side to the upper side to be described later) is received in a state in which the first application (for example, a navigation application 121 to be described later) and the second application (for example, a music application 122 to be described later) are displayed on the display device (for example, a display 24 to be described later) as the display switching unit (for example, a display switching unit 113 to be described later).

According to the program of (19), the application is switched from the first application (for example, a navigation application 121 to be described later) to the second application (for example, a music application 122 to be described later) in accordance with a swiping operation executed in the first direction and is switched from the second application to the first application in accordance with a swiping operation executed in the second direction. Accordingly, the switching to the first application having a high use frequency during driving can be executed intuitively and easily, and change of viewpoint during driving can be suppressed.

(20) The program described in (18) or (19), wherein the program further causes the information terminal (for example, an information terminal 50 to be described later) to function as: a determination unit (for example, a determination unit 114 to be described later) determining whether the user's operation received through the touch panel (for example, a touch panel 241 to be described later) is the first type touch (for example, a multi-touch to be described later) or the second type touch (for example, a single touch to be described later); and an AP operating unit (for example, an AP operating unit 115 to be described later) executing an operation of the application displayed on the display device (for example, a display 24 to be described later) based on the swiping operation in a case when the user's swiping operation received through the touch panel is determined to be the second type touch by the determination unit, wherein the program causes the information terminal to function to display the first application and the second application (for example, a music application 122 to be described later) on the display device in a case when the user's swiping operation executed in a first direction (for example, from the right side to the left side to be described later, from the left side to the right side to be described later, from the upper side to the lower side to be described later, or from the lower side to the upper side to be described later) received through the touch panel is determined to be the first type touch by the determination unit in a state in which the first application (for example, a navigation application 121 to be described later) is displayed on the display device as the display switching unit (for example, a display switching unit 113 to be described later).

According to the program of (20), in a case when a user's operation received through the touch panel is a first type touch (for example, a multi-touch to be described later), display switching is executed, and, in the case of a second type touch (for example, a single touch to be described later), an operation for the application that is displayed is executed. Accordingly, switching among applications or an operation for the application during driving can be executed intuitively and easily, and change of viewpoint during driving can be suppressed.

(21) The program according to any one of (18) to (20), wherein the first type touch is a multi-touch, the first application (for example, a navigation application 121 to be described later) is an application having a navigation function, and the specific position on the first application is a current position of the information terminal displayed on the map that is displayed.

According to the program of (21), the second application (for example, a music application 122 to be described later) having a curved boundary line on a designated radius from the current position of the information terminal displayed on the map by the application (for example, a navigation application 121) having a navigation function is displayed, and accordingly, the neighboring information of the current position of the information terminal that is important to the user is not blocked, and there is no influence on driving.

In addition, switching among applications or an operation for the application during driving can be executed intuitively and easily, and change of viewpoint during driving can be suppressed.

(22) A method of controlling applications that is executed by an information terminal (for example, an information terminal 50 to be described later) controlling operations of the applications based on a user's operation received through a touch panel (for example, a touch panel 241 to be described later) mounted on a display device (for example, a display 24 to be described later), the method including: a display switching step (for example, a display switching step to be described later) displaying a first application and a second application (for example, a music application 122 to be described later) having a curved boundary line on a designated radius from a specific position on the first application on the display device based on a user's first type touch swiping operation (for example, a multi-touch to be described later) executed in a first direction (for example, from the right side to the left side to be described later, from the left side to the right side to be described later, from the upper side to the lower side to be described later, or from the lower side to the upper side to be described later) that is received through the touch panel in a state in which the first application (for example, a navigation application 121 to be described later) is displayed on the display device.

(23) The method of controlling applications described in (22), wherein the display switching step (for example, a display switching step to be described later) further includes a step for displaying the first application on the entire face of the display device in a case when a first type touch swiping operation (for example, a multi-touch to be described later) executed in a second direction that is the direction opposite to the first direction (for example, from the right side to the left side to be described later, from the left side to the right side to be described later, from the upper side to the lower side to be described later, or from the lower side to the upper side to be described later) is received in a state in which the first application (for example, a navigation application 121 to be described later) and the second application (for example, a music application 122 to be described later) are displayed on the display device (for example, a display 24 to be described later).

(24) The method of controlling applications described in (22) or (23), further including: a determination step (for example, a determination step to be described later) determining whether the user's operation received through the touch panel (for example, a touch panel 241 to be described later) is a first type touch (for example, a multi-touch to be described later) or a second type touch; and an AP operating step (for example, an AP operating step to be described later) executing an operation of the application displayed on the display device (for example, a display 24 to be described later) based on the swiping operation in a case when the user's swiping operation received through the touch panel is determined to be the second type touch (for example, a single touch to be described later) in the determination step, wherein the display switching step includes displaying the first application and the second application (for example, a music application 122 to be described later) on the display device in a case when the user's swiping operation executed in a first direction (for example, from the right side to the left side to be described later, from the left side to the right side to be described later, from the upper side to the lower side to be described later, or from the lower side to the upper side to be described later) received through the touch panel is determined to be the first type touch in the determination step in a state in which the first application (for example, a navigation application 121 to be described later) is displayed on the display device.

(25) The method of controlling applications described in any one of (22) to (24), wherein the first type touch is a multi-touch, the first application (for example, a navigation application 121 to be described later) is an application having a navigation function, and the specific position on the first application is the current position of the information terminal (for example, an information terminal 50 to be described later) displayed on the map that is displayed.

According to the methods of (22) to (25), the same effects as those of the programs (18) to (21) are acquired.

(26) An information terminal (for example, in information terminal 50 to be described later) including: a display device including a touch panel (for example, a touch panel 241 to be described later) mounted on the display device (for example, a display 24 to be described later); and a display switching unit (for example, a display switching unit 113 to be described later) displaying a first application and a second application (for example, a music application 122 to be described later) having a curved boundary line on a designated radius from a specific position on the first application on the display device based on a user's first type touch swiping operation (for example, a multi-touch to be described later) executed in a first direction (for example, from the right side to the left side to be described later, from the left side to the right side to be described later, from the upper side to the lower side to be described later, or from the lower side to the upper side to be described later) that is received through the touch panel in a state in which the first application (for example, a navigation application 121 to be described later) is displayed on the display device.

(27) The information terminal (for example, an information terminal 50 to be described later) described in (26), wherein the display switching unit (for example, a display switching unit 113 to be described later) further displays the first application on the entire face of the display device in a case when a first type touch swiping operation (for example, a multi-touch to be described later) executed in a second direction that is the direction opposite to the first direction (for example, from the right side to the left side to be described later, from the left side to the right side to be described later, from the upper side to the lower side to be described later, or from the lower side to the upper side to be described later) is received in a state in which the first application (a navigation application 121 to be described later) and the second application (for example, a music application 122 to be described later) are displayed on the display device (for example, a display 24 to be described later).

(28) The information terminal (for example, an information terminal 50 to be described later) described in (26) or (27), further including: a determination unit (for example, a determination unit 114 to be described later) determining whether the user's operation received through the touch panel (for example, a touch panel 241 to be described later) is a first type touch (for example, a multi-touch to be described later) or a second type touch (for example, a single touch to be described later); and an AP operating unit (for example, an AP operating unit 115 to be described later) executing an operation of the application displayed on the display device (for example, a display 24 to be described later) based on the swiping operation in a case when the user's swiping operation received through the touch panel is determined to be the second type the touch by the determination unit, wherein the display switching unit (for example, a display switching unit 113 to be described later) displays the first application and the second application (for example, a music application 122 to be described later) on the display device in a case when the user's swiping operation executed in a first direction (for example, from the right side to the left side to be described later, from the left side to the right side to be described later, from the upper side to the lower side to be described later, or from the lower side to the upper side to be described later) received through the touch panel is determined to be the first type touch by the determination unit in a state in which the first application (for example, a navigation application 121 to be described later) is displayed on the display device.

(29) The information terminal (for example, an information terminal 50 to be described later) described in any one of (26) to (28), wherein the first type touch is a multi-touch, the first application is an application having a navigation function, and the specific position on the first application is the current position of the information terminal displayed on the map that is displayed.

According to the information terminals (for example, an information terminal 50 to be described later) of (26) to (29), the same effects as those of the programs (18) to (29) are acquired.

(30) A computer-readable recording medium having the program described in any one of (18) to (21) recorded thereon.

According to the recording medium of (30), the same effects as those of the programs of (18) to (21) are acquired.

Effects of the Invention

According to the present invention, an information terminal, which includes a touch panel, mounted in a vehicle can be operably controlled without influencing driving.

PREFERRED MODE FOR CARRYING OUT THE INVENTION

Hereinafter, a preferred embodiment of the present invention will be described with reference to the drawings. A program according to the present invention is applied to an information terminal 50 and realizes various functions of the information terminal 50. The information terminal 50 is a terminal device that receives a user's operation through a touch panel and, for example, a smartphone or a tablet terminal can be used.

First Embodiment

First, a first embodiment will be described with reference to FIGS. 1 to 6.

System Configuration of Information Terminal 50

Figure 1:
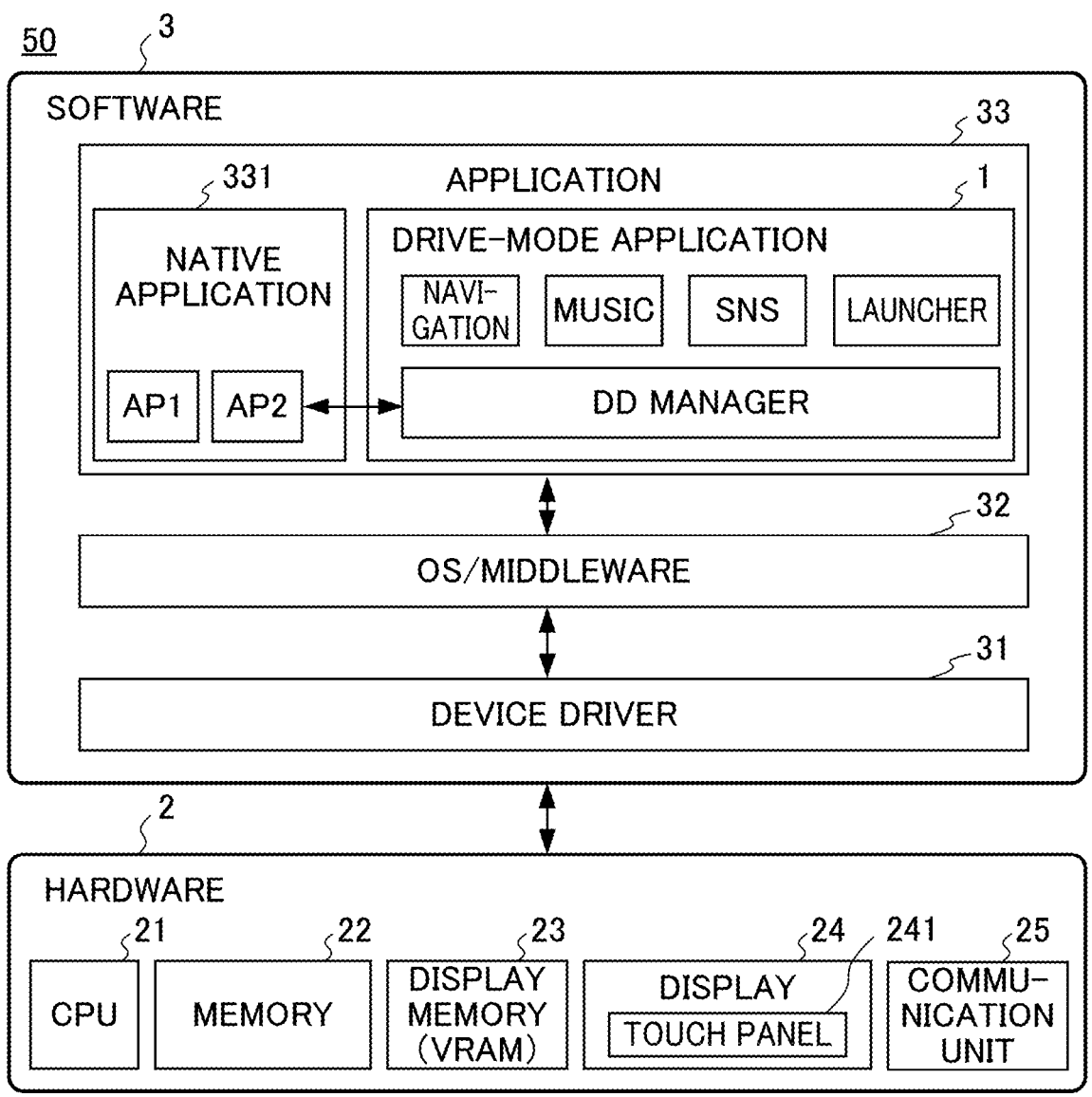
FIG. 1 is diagram that illustrates the system configuration of an information terminal to which a drive-mode application according to the present invention is installed.

The system configuration of an information terminal 50 on which a program according to the present invention is installed will be described with reference to FIG. 1. FIG. 1 is a diagram that illustrates the system configuration of the information terminal 50.

The information terminal 50 is configured to include at least: a CPU 21; a memory 22; a display memory (VRAM: Video RAM) 23; a display 24; and a communication unit 25 as hardware 2 and to include at least a device driver 31; an OS/middleware 32; and an application 33 as software 3.

The CPU 21 is a part that integrally controls the information terminal 50 and reads and executes various programs, thereby realizing various functions to be described later in cooperation with the hardware described above. The memory 22 stores programs that are appropriately read and executed and stores various kinds of information generated by executing the programs. The display memory 23 is a memory that maintains data to be displayed on the display 24.

The display 24 displays a predetermined image. A touch panel 241 is mounted on the surface of the display 24, and receives the user's operations. In this embodiment, the operations received by the touch panel 241 include a selection operation (a so-called tap) selecting an arbitrary position of the display 24 and a swiping operation (a so-called swipe or flick) involving moving a finger after selecting an arbitrary position of the display 24. The touch panel 241 is configured by a multi-touch panel capable of sensing a plurality of contact points. An operation received through the touch panel 241 is transmitted to a processing system (CPU 21) and is processed.

The communication unit 25 connects the information terminal 50 and another device to each other through a wired connection or a wireless connection and controls communication executed between them. In this embodiment, the communication unit 25 connects the information terminal 50 and a control device (for example, an ECU: engine control unit) of a vehicle to each other. The method of connecting the information terminal 50 and the control device of the vehicle is arbitrary. For example, the connection may be made by attaching the information terminal 50 to an attachment dock arranged in the vehicle or by using a predetermined cable such as a feeder cable supplying electricity to a signal cable such as a USB (registered trademark) or the information terminal 50. In addition, the information terminal 50 and the control device of the vehicle may be connected to each other through a wireless connection such as a wireless LAN or Bluetooth (registered trademark) connection.

The device driver 31 controls the hardware described above. In this embodiment, in accordance with an instruction from the OS/middleware 32, data is written into the display memory 23, and the display of the display 24 is controlled based on the written data. The OS/middleware 32 is responsible for relaying between the application 33 and the hardware 2 and additionally executes management of resources of the system and the like. In addition, the OS/middleware 32 according to this embodiment supports a multi-tasking environment in the information terminal 50.

The application 33 is software having a function for executing an operation desired to be executed by the user of the information terminal 50. The application 33 includes at least a drive-mode application 1 that is a program according to the present invention and a native application 331. The native application 331 refers to arbitrary applications other than the drive-mode application 1 and includes an application permitted to be used during driving and an application not permitted to be used during driving.

The drive-mode application 1 is an application that operates when a connection between the information terminal 50 and the vehicle is detected, when a user's operation is received in addition to the detection of a connection to the vehicle, or when the vehicle is detected to be in the course of driving in addition to a detection of a connection to the vehicle and realizes a user interface that manages input/output from/to a crew member (driver) of the vehicle. The drive-mode application 1, for example, is described in HTML5 and is configured to include: a DD manager that prohibits a complicated operation and the like during driving; a plurality of applications that operate on the drive-mode application 1; and an independent launcher that switches an application to be operated.

The plurality of applications are applications that can be used during driving and include an application added later in addition to applications set in advance. The drive-mode application 1 may operate the native applications 331 by referring to the native applications 331. In such a case, among the native applications 331, functions that are not desirable to be used during driving are restricted by the DD manager.

Structure of Drive-Mode Application 1

Figure 2:
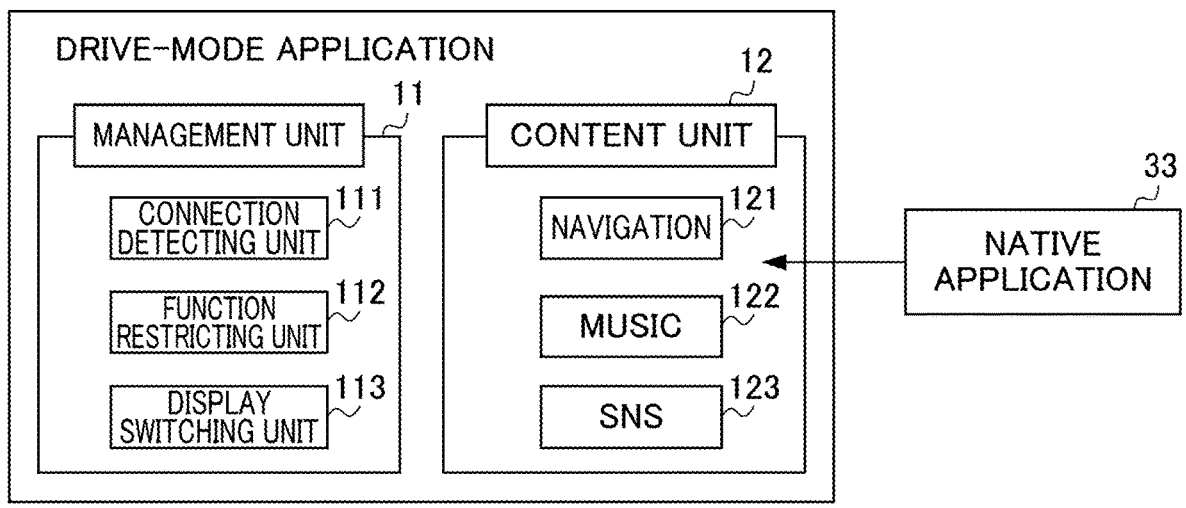
FIG. 2 is a diagram that illustrates the structure of a drive-mode application according to a first embodiment.

Subsequently, the structure of the drive-mode application 1 that is the program according to the present invention will be described with reference to FIG. 2. As illustrated in FIG. 2, the drive-mode application 1 is configured to include: a management unit 11 that executes control in consideration of the prevention of driver distraction; and a content unit 12 that includes an application operating on the drive-mode application 1.

The content unit 12 stores a plurality of applications. In this embodiment, the content unit 12 is assumed to store: a navigation application 121 that realizes a car navigation system; a music application 122 that realizes the playing of music; and an SNS application 123 that supports ties among users. A plurality of applications stored in the content unit 12 operate on the drive-mode application 1 one at a time or two or more at the same time.

The applications stored in the content unit 12 are not limited to the music application 122 and the SNS application 123. The content unit 12 can store arbitrary applications. For example, although not illustrated in the drawing, the content unit 12 can store: navigation auxiliary applications (sub application 3) such as a destination search application and a neighboring guide application; and information applications (sub application 4) such as a traffic information application, a disaster information application, a vehicle information application; and a selling store information application.

The information terminal 50 executes the management unit 11, thereby causing the CPU 21 to function as a connection detecting unit 111; a function restricting unit 112; and a display switching unit 113.

In addition, the information terminal 50 executes the management unit 11, thereby causing the CPU 21 to execute a control method of an application including a connection detecting step, a function restricting step, and a display switching step.

Hereinafter, the connection detecting unit 111, the function restricting unit 112, and the display switching unit 113 included in the information terminal 50 by executing the management unit 11 will be described. The connection detecting step, the function restricting step, and the display switching step included in the control method of an application that is executed by the information terminal 50 by executing the management unit 11 can be described by substituting "unit" with "step" in the following description, and thus, a description thereof will not be presented.

The connection detecting unit 111 detects a connection between the information terminal 50 and the vehicle. In other words, the connection detecting unit 111 detects a wired connection or a wireless connection between the information terminal 50 and the vehicle through the communication unit 25.

When the connection detecting unit 111 detects a connection between the information terminal 50 and the vehicle, receives a user's operation in addition to the detection made by the connection detecting unit 111, or detects that the vehicle is in the course of driving in addition to the detection made by the connection detecting unit 111, the function restricting unit 112 controls the operation of applications based on second control other than first control that is a control state of the information terminal 50 at a normal time at which the information terminal 50 is not connected to the vehicle. In the second control, in order to satisfy the requirements to prevent driver distraction, some of user's operations that can be accepted in the first control are restricted, and some of applications that can be operated in the first control are restricted. For example, an operation such as a text input that is complicated and requires a steady gaze at the display 24 corresponds to a user's operation restricted in the second control and a moving image reproducing application involving staring at the display 24 corresponds to an application restricted in the second control.

The display switching unit 113 switches the kind of application to be displayed on the display 24 based on a swiping operation received through the touch panel 241. In a smartphone or the like, normally, since the kind of application is switched based on icons arranged on the home screen, it can be regarded that the display switching unit 113 switches the kind of application to be displayed on the display 24 in a form different from that of a normal time at which the information terminal 50 is not connected to the vehicle.

The display switching made by the display switching unit 113 will be described later in detail with reference to FIG. 4 and the like.

Display Example of Display 24

Figure 3A:
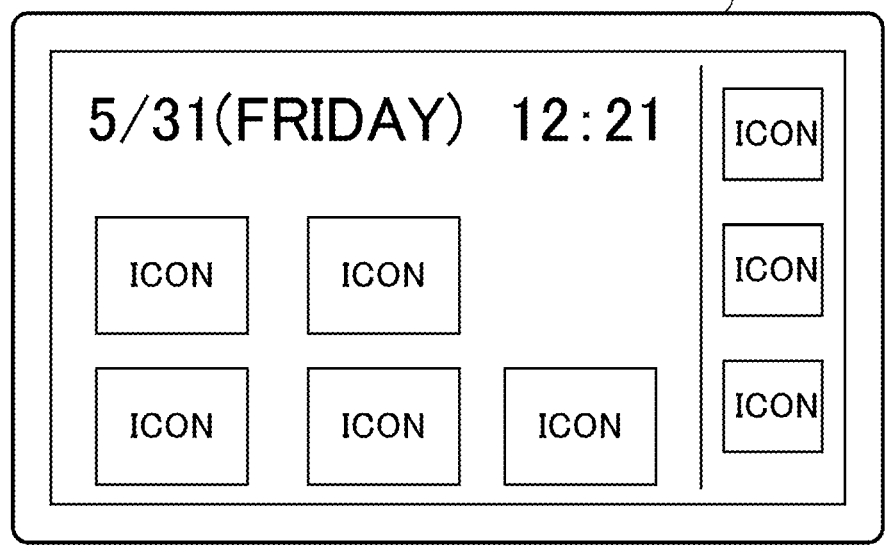
FIG. 3A is a display example of an information terminal.
Figure 3B:
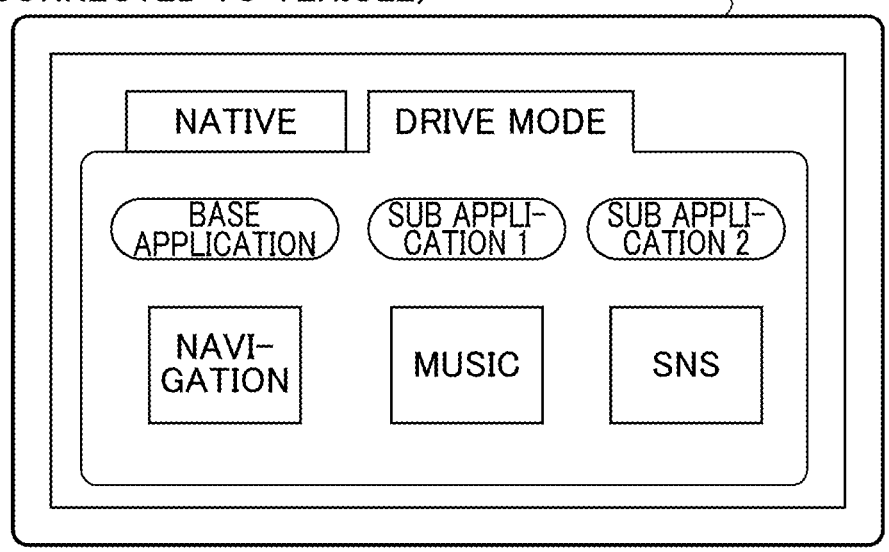
FIG. 3B is a display example of an information terminal.

Subsequently, display examples of the display 24 will be described with reference to FIGS. 3A to 3C. In FIG. 3A and subsequent drawings, while a landscape-oriented display will be described as an example of the display, the present invention may be realized by a portrait-oriented display.

FIG. 3A illustrates a display example at a normal time at which the information terminal 50 and the vehicle are not connected to each other. At the normal time, a plurality of icons are displayed on the home screen of the display 24. When such an icon is selected through the touch panel 241, an application corresponding thereto operates and is displayed on the display 24.

When the information terminal 50 and the vehicle are connected to each other, the drive-mode application 1 operates. FIG. 3B illustrates an operation screen at the time of operating the drive-mode application 1. When the drive-mode application 1 operates, first, an application operating on the drive-mode application 1 is set. Such a setting is executed by selecting an arbitrary application from among the applications stored in the content unit 12. It is apparent that an arbitrary application may be selected not from among applications stored in the content unit 12 but from among the native applications.

On the drive-mode application 1, an application operating on the drive-mode application 1 can be set in advance. At this time, a plurality of applications can be set as the application operating on the drive-mode application 1. The plurality of applications include a plurality of sub applications that are auxiliary in addition to one base application that is basic. In this embodiment, it is assumed that the navigation application 121 is set as the base application, the music application 122 is set as a sub application 1, and the SNS application 123 is set as a sub application 2. In addition, although not illustrated in the drawing, for example, navigation auxiliary applications (sub application 3), such as a destination search application and a neighboring guide application and information applications (sub application 4) such as a traffic information application, a disaster information application, a vehicle information application, and a selling store information application, can be set.

When the setting of applications ends, a basic display for the drive-mode application 1 is displayed on the display 24. In addition, by setting an application to be operated on the drive-mode application 1 in advance, when the drive-mode application 1 operates, the basic display for the drive-mode application 1 may be displayed on the display 24. The basic display is executed based on the application set as the base application, and, in FIG. 3C, the display screen of the car navigation system that is based on the navigation application 121 is displayed on the display 24. In the car navigation system, an icon representing the position of the user's own vehicle is displayed at the center (so-called "north-up"), and, in accordance with the movement of the user's own vehicle, the map is scrolled and displayed.

Display Switching Executed by Display Switching Unit 113

Figure 3C:
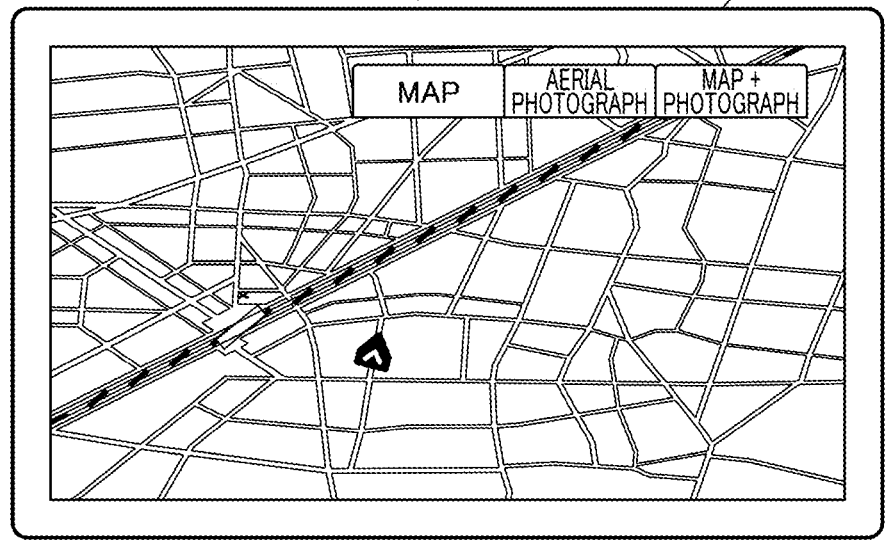
FIG. 3C is a display example of an information terminal.

On the display screen illustrated in FIG. 3C, when a crew member of the vehicle executes a swiping operation through the touch panel 241, the display switching unit 113 switches the kinds of application to be displayed on the display 24. The display switching executed by the display switching unit 113 is illustrated in FIG. 4.

Figure 4:
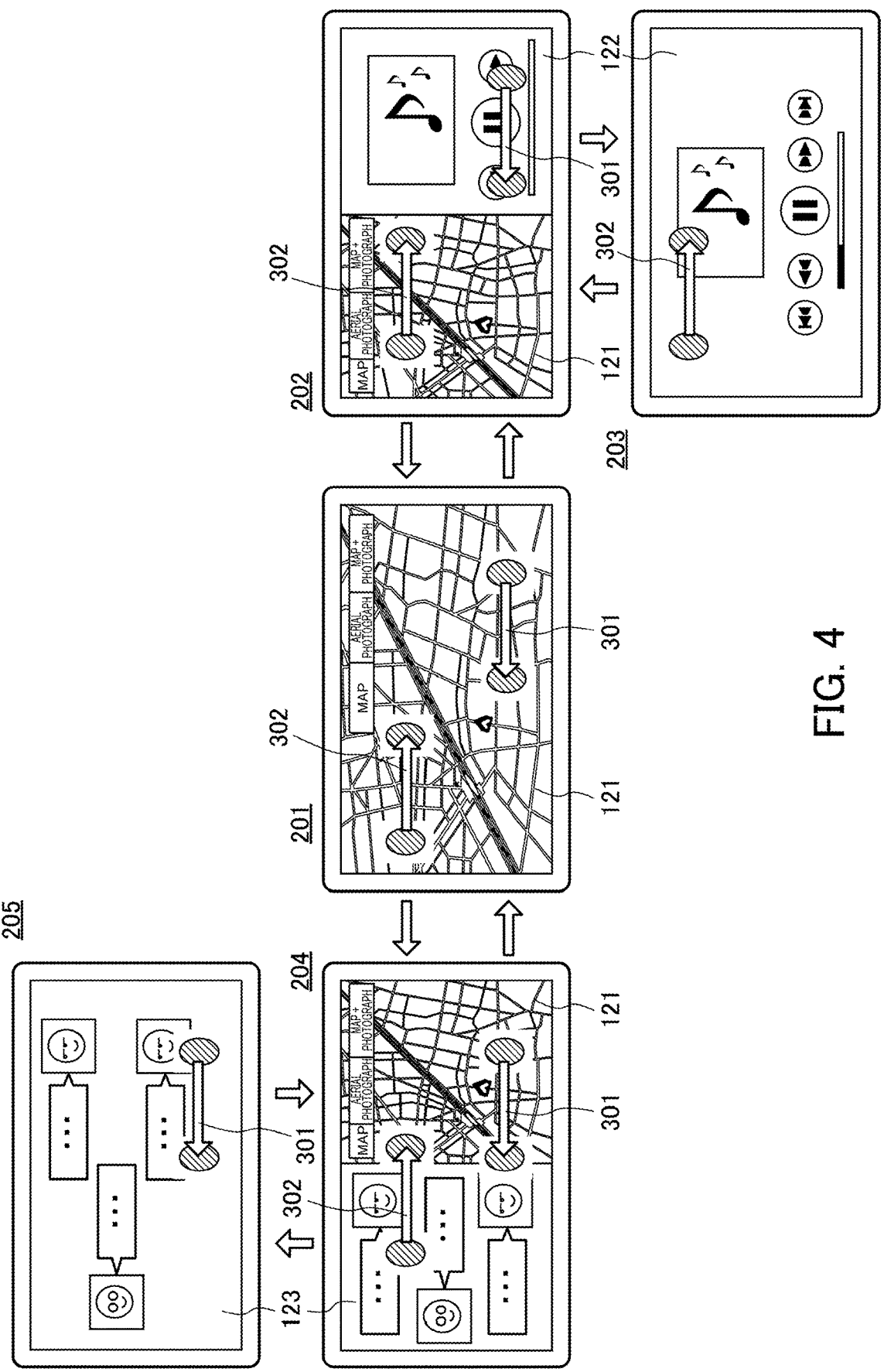
FIG. 4 is a diagram that illustrates display switching executed by a display switching unit.

In FIG. 4, a swiping operation 301 (from the right side to the left side) is an operation of moving a finger to the left side after bringing the finger into contact with the touch panel 241, and a swiping operation 302 (from the left side to the right side) is an operation of moving a finger to the right side after bringing the finger into contact with the touch panel 241.

As illustrated in FIG. 4, on the display screen 201, as the basic display for the drive-mode application 1, the navigation application 121 (base application) is displayed on the entire face of the display 24. On this display screen 201, when a crew member of the vehicle executes the swiping operation 301 (from the right side to the left side) through the touch panel 241, the display switching unit 113 switches the display of the display 24 from the display screen 201 to the display screen 202.

On this display screen 202, the navigation application 121 (base application) is displayed on the left half of the display 24, and the music application 122 (sub application 1) is displayed on the right half of the display 24. Here, since the swiping operation 301 (from the right side to the left side) is an operation of moving a finger to the left side, in the display switching from the display screen 201 to the display screen 202, the displays are switched so that the music application 122 enters the display 24 from the right outer side of the display 24 in accordance with the movement of the finger (half-in).

On the display screen 202, when a crew member of the vehicle executes the swiping operation 301 (from the right side to the left side) through the touch panel 241, the display switching unit 113 switches the display of the display 24 from the display screen 202 to the display screen 203.

On this display screen 203, the music application 122 (sub application 2) is displayed on the entire face of the display 24. In this way, when the crew member of the vehicle executes the swiping operation 301 (from the right side to the left side), the display switching unit 113 switches the display from the display screen 201 (the navigation application 121 displayed on the entire face) to the display screen 202 (the navigation application 121 displayed on the left half face and the music application 122 displayed on the right half face) and the display screen 203 (the music application 122 displayed on the entire face).

On the other hand, on the display screen 202, when a crew member of the vehicle executes the swiping operation 302 (from the left side to the right side) through the touch panel 241, the display switching unit 113 returns the display of the display 24 from the display screen 202 to the display screen 201 and displays the navigation application 121, which has been displayed on the left half face of the display 24, on the entire face of the display 24.

The display switching executed by the display switching unit 113 in a case when the swiping operation 302 (from the left side to the right side) is executed is basically the same as that of a case when the swiping operation 301 (from the right side to the left side) is executed. In other words, on the display screen 201, when the swiping operation 302 (from the left side to the right side) is executed, the display switching unit 113 switches the display of the display 24 from the display screen 201 to the display screen 204 (half-in). At this time, while the music application 122 (sub application 2) has been newly displayed on the display screen 202, the SNS application 123 (sub application 3) is newly displayed on the display screen 204.

Then, on the display screen 204, when the swiping operation 302 (from the left side to the right side) is executed, the display switching unit 113 switches the display of the display 24 from the display screen 204 to the display screen 205 and displays the SNS application 123, which has been displayed on the left half face, on the entire screen of the display 24. On the display screen 204, when the swiping operation 301 (from the right side to the left side) is executed, the display switching unit 113 returns the display of the display 24 from the display screen 204 to the display screen 201 and displays the navigation application 121, which has been displayed on the right half face of the display 24, on the entire face of the display 24.

As above, in the drive-mode application 1, by the crew member of the vehicle only executing the swiping operation through the touch panel 241, an application to be displayed on the display 24 can be switched to another application, and, also in a case when the application that has been switched once is to be returned to the origin, it is sufficient for the crew member of the vehicle to execute the swiping operation in the opposite direction through the touch panel 241. For this reason, the display 24 does not need to be visually recognized unlike an icon operation, the switching between applications can be intuitively executed, whereby the change of viewpoint during driving can be suppressed.

In case of FIG. 4, while the number of the sub applications to be switched to from the base application is two, the number of sub applications may be further increased. While the display switching of a case when the number of sub applications is increased may be arbitrarily executed, an example thereof is illustrated in FIGS. 5 and 6.

Figure 5:
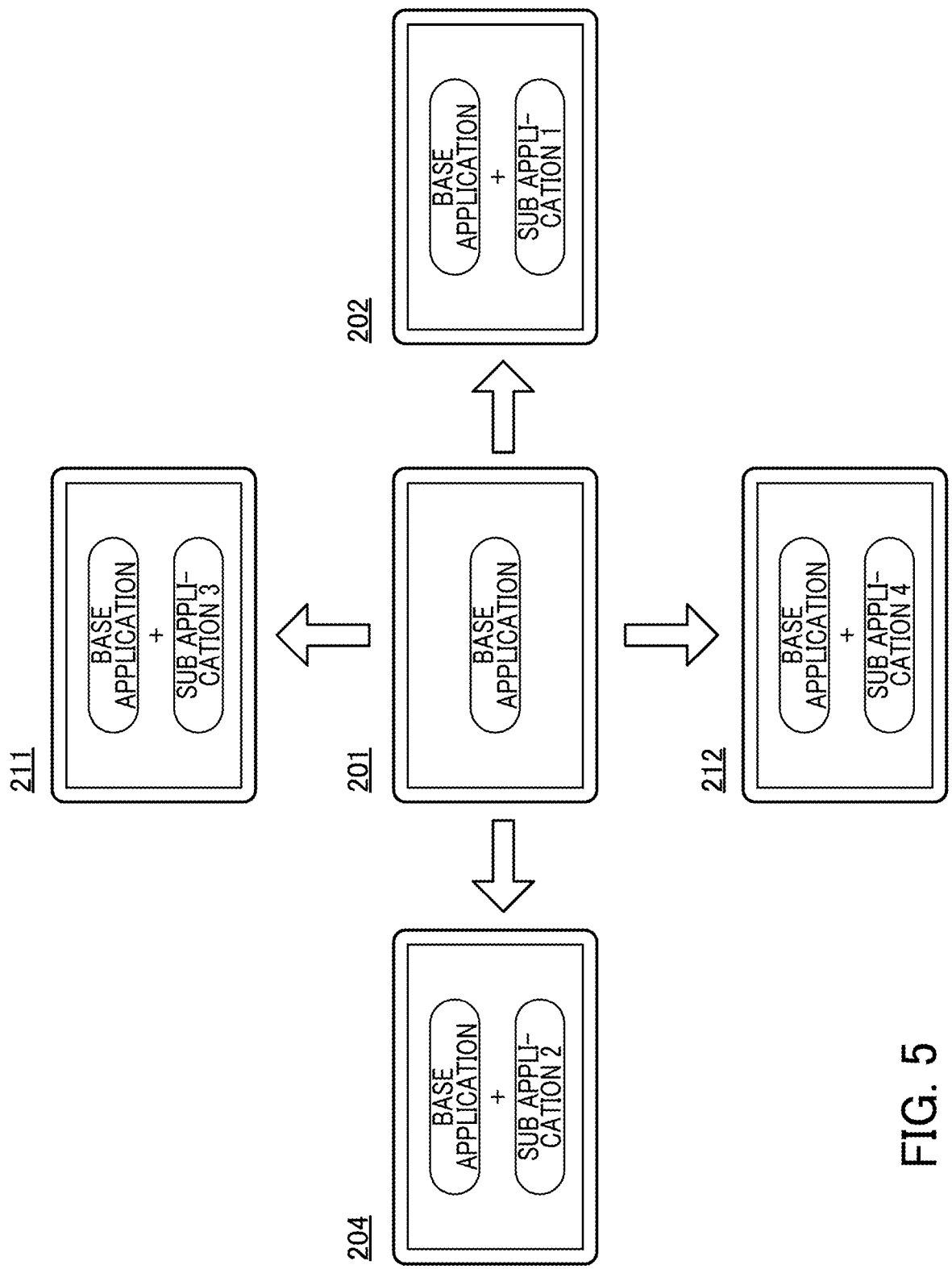
FIG. 5 is a diagram that illustrates display switching executed by a display switching unit.
Figure 6:
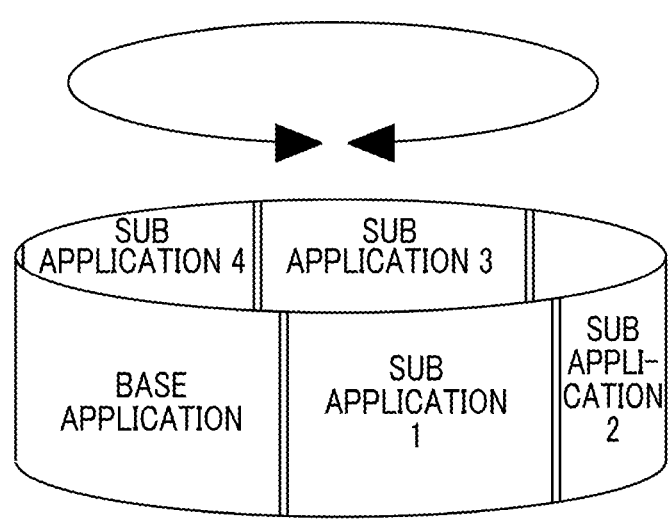
FIG. 6 is a diagram that illustrates display switching executed by a display switching unit.

In case of FIG. 4, while an application to be displayed on the display 24 is switched based on a horizontal swiping operation, in case of FIG. 5, an application to be displayed on the display 24 is switched based on a vertical swiping operation in addition to a horizontal swiping operation.

As illustrated in FIG. 5, on the display screen 201, the base application is displayed on the entire face of the display 24. On this display screen 201, when a horizontal swiping operation is executed, the display of the display 24 is switched to the display screens 202 and 204. This point is as illustrated in FIG. 4.

On the other hand, on this display screen 201, when a vertical swiping operation, for example, a swiping operation of moving a finger brought into contact with the touch panel 241 to the lower side is executed, the display of the display 24 is switched from the display screen 201 to a display screen 211. In other words, the base application is displayed on one half face of the display 24, and the sub application 3 is displayed on the other half face of the display 24. Similarly, on the display screen 201, when a swiping operation of moving a finger brought into contact with the touch panel 241 to the upper side is executed, the display of the display 24 is switched from the display screen 201 to a display screen 212, and the base application is displayed on one half face of the display 24, and the sub application 4 is displayed on the other half face of the display 24. The half face of the display 24 in the display switching according to a vertical swiping operation may be either a vertical half face or a horizontal half face.

In this way, by switching an application to be displayed on the display 24 based on a vertical swiping operation in addition to a horizontal swiping operation, switching among a maximum of four sub applications can be executed.

A different method will be described with reference to FIG. 6. A base application and sub applications are arranged in a circular shape, and an application to be displayed on the display 24 is switched based on a horizontal swiping operation. In other words, on a display screen on which the base application is displayed on the entire face, when a swiping operation (from the right side to the left side) is executed, the base application and the sub application 1 are displayed on a half face, and, on this display screen, when the swiping operation (from the right side to the left side) is again executed, the sub application 1 is displayed on the entire face. Then, on the display screen on which the sub application 1 is displayed on the entire face, when a swiping operation (from the right side to the left side) is executed, the sub application 1 and the sub application 2 are displayed on a half face, and, on this swiping screen, when the swiping operation (from the right side to the left side) is again executed, the sub application 2 is displayed on the entire face.

In this way, by executing switching among the base application and the sub applications arranged in the circular shape based on a horizontal swiping operation, switching among an arbitrary number of sub applications can be executed.

According to the drive-mode application 1 of the first embodiment described above, the following effects can be acquired.

The function restricting unit 112 controls the operations of applications in the first control at the normal time when there is no connection to a vehicle and controls the operations of the applications in the second control other than the first control at the time when there is a connection to a vehicle.

In this way, an operation and the like that are not desirable during driving of the vehicle can be appropriately prohibited, and the information terminal 50 including the touch panel 241 mounted in a vehicle can be operably controlled without influencing driving.

At this time, in the control process according to the second control, the function restricting unit 112 restricts some of user's operations that can be accepted in the first control and restricts some of the operable applications that can be operated in the first control.

Accordingly, an operation (for example, inputting text) or an application (for example, reproduction of a moving image) requiring the display 24 being watched can be prohibited when there is a connection to a vehicle, and the information terminal 50 including the touch panel 241 mounted on a vehicle can be operably controlled without influencing driving.

In addition, the display switching unit 113 executes switching among the kinds of application to be displayed on the display 24 of the information terminal 50 based on a swiping operation, which is executed in a first direction, received through the touch panel 241.

Accordingly, switching among applications can be intuitively executed, and there is no influence on driving.

At this time, in a case when the swiping operation 301 (from the right side to the left side) is received on the display screen 201 displaying the base application on the entire face, the display switching unit 113 switches the display of the display 24 to the display screen 202 displaying the base application and the sub application 1. Then, in a case when the swiping operation 301 (from the right side to the left side) is received on the display screen 202, the display switching unit 113 switches the display to the display screen 203 displaying the sub application 1 on the entire face, and, in a case when the swiping operation 302 (from the left side to the right side) is received, the display switching unit 113 switches the display to the display screen 201 displaying the base application on the entire face.

Accordingly, switching to the base application having a high use frequency during driving can be executed intuitively and easily, and change of viewpoint during driving can be suppressed.

Another Method of Display Switching Executed by Display Switching Unit 113

Another method of display switching executed by the display switching unit 113 according to the first embodiment will be described with reference to FIGS. 7 and 8A to 8C.

Figure 7:
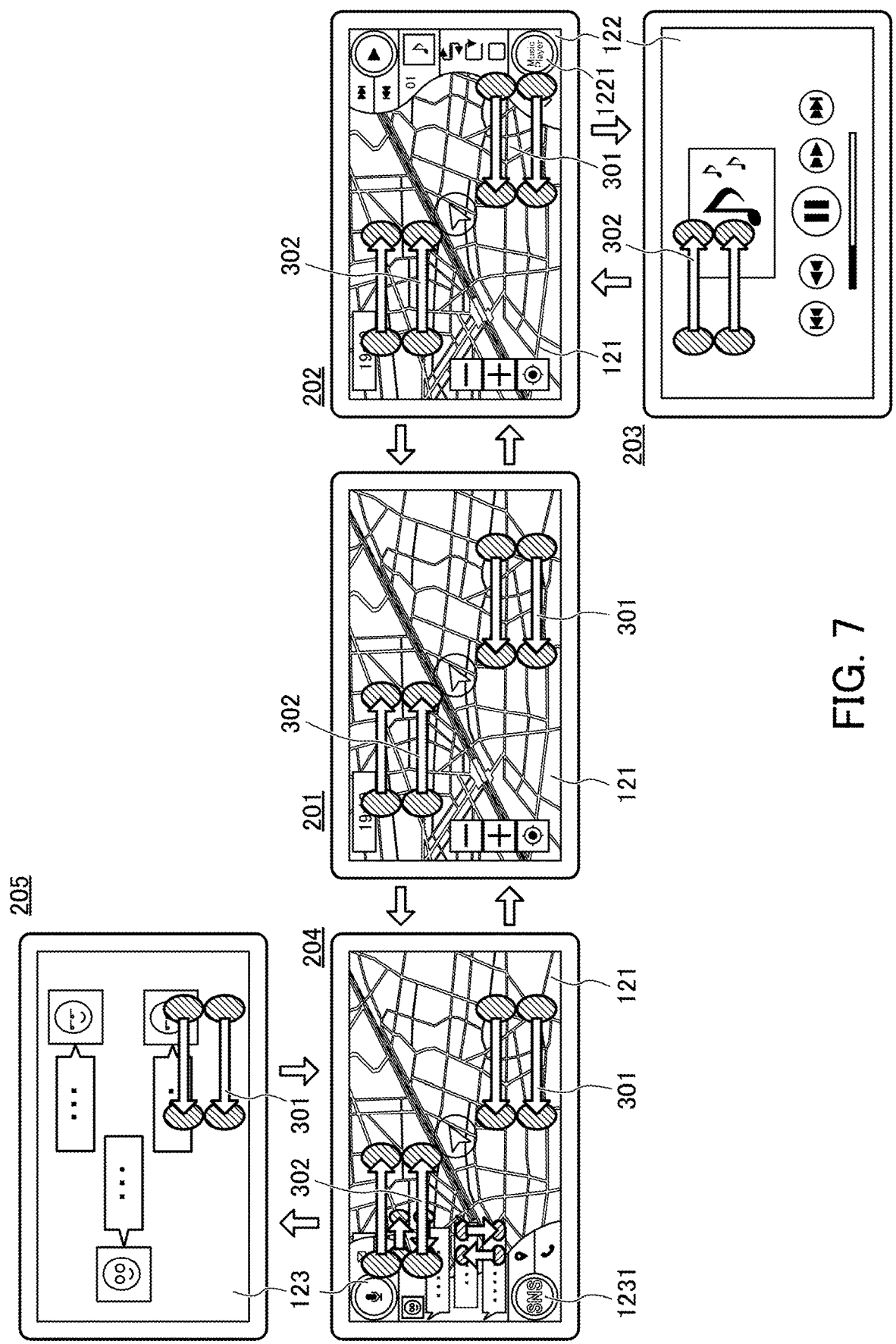
FIG. 7 is a diagram that illustrates display switching executed by a display switching unit using another method.

By referring to FIG. 7, on a display screen 201, the navigation application 121 (base application) is displayed on the entire face of the display 24 as the basic display of the drive-mode application 1. On this display screen 201, when a crew member of the vehicle executes the swiping operation 301 (from the right side to the left side) through the touch panel 241, the display switching unit 113 switches the display of the display 24 from the display screen 201 to a display screen 202.

On this display screen 202, the music application 122 (sub application 1) is displayed on the right side of the display 24, and the navigation application 121 (base application) is displayed in the other area (remaining area) as it is. In other words, for the user, visually, the music application 122 (sub application 1) is depicted as being superimposed on the navigation application 121 (base application). Generally, such a sub application is also called a "widget". Here, since the swiping operation 301 (from the right side to the left side) is an operation of moving a finger to the left side, in the display switching from the display screen 201 to the display screen 202, the displays are switched so that the music application 122 enters the display 24 from the right outer side of the display 24 in accordance with the movement of the finger (hereinafter, also referred to as "swiping in").

When an entire screen display button 1221 arranged on the music application 122 is tapped (pressed), the display switching unit 113 switches the display of the display 24 from the display screen 202 to the display screen 203. On this display screen 203, the music application 122 (sub application 1) is displayed on the entire face of the display 24.

Figure 8A:
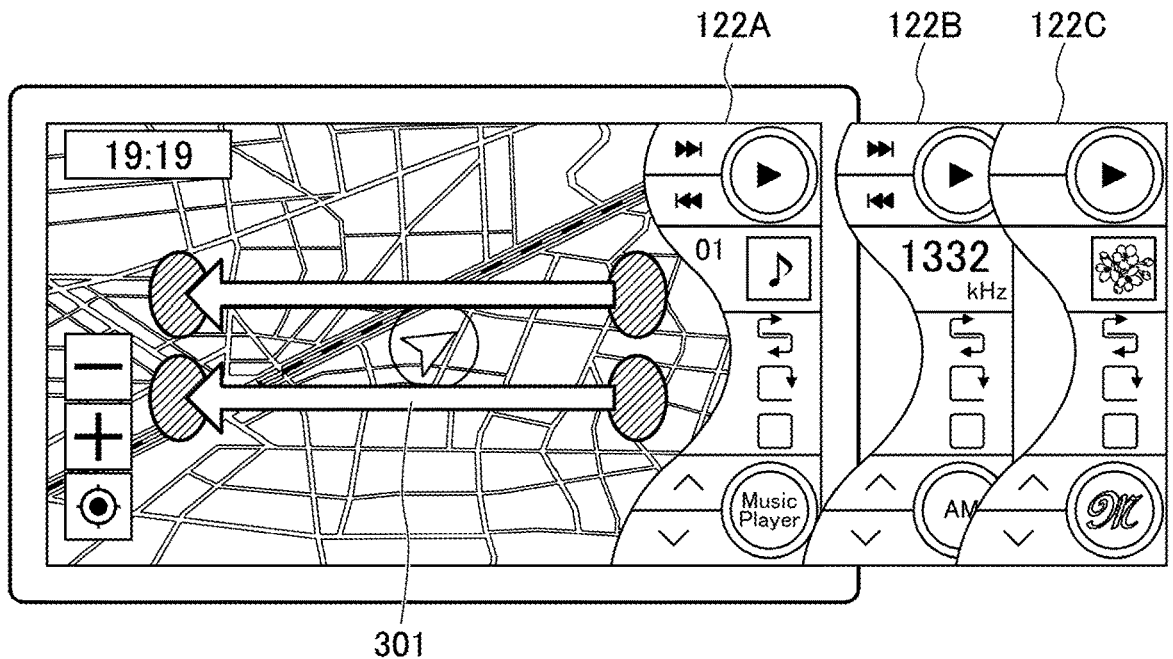
FIG. 8A is a diagram that illustrates display switching executed by a display switching unit using another method.

While details will be described next with reference to FIG. 8A, on the display screen 202, when a crew member of the vehicle again executes the swiping operation 301 (from the right side to the left side) through the touch panel 241, the display switching unit 113 again swipes in a music application 122 of a kind different from that of the music application 122 displayed on the display screen 202 among a plurality of music applications 122.

On the other hand, on the display screen 202, when the crew member of the vehicle executes the swiping operation 302 (from the left side to the right side) through the touch panel 241, the display switching unit 113 returns the display of the display 24 from the display screen 202 to the display screen 201 and displays the navigation application 121, which has been displayed in the remaining area of the display 24, on the entire face of the display 24.

The display switching executed by the display switching unit 113 in a case when the swiping operation 302 (from the left side to the right side) is executed is basically the same as that executed in a case when the swiping operation 301 (from the right side to the left side) is executed. In other words, on the display screen 201, when the swiping operation 302 (from the left side to the right side) is executed, the display switching unit 113 switches the display of the display 24 from the display screen 201 to the display screen 204 (swiping in). At this time, on the display screen 204, the SNS application 123 (sub application 2) is displayed on the left side of the display 24, and the navigation application 121 (base application) is displayed in the other area (remaining area) as it is.

When an entire screen display button 1231 arranged on the SNS application 123 is tapped (pressed), the display switching unit 113 switches the display of the display 24 from the display screen 204 to the display screen 205 and displays the SNS application 123, which has been displayed on the left side, on the entire face of the display 24. In addition, on the display screen 204, when the swiping operation 301 (from the right side to the left side) is executed, the display switching unit 113 returns the display of the display 24 from the display screen 204 to the display screen 201 and displays the navigation application 121, which has been displayed in the remaining area of the display 24, on the entire face of the display 24.

While details will be described next, when the swiping operation 302 (from the left side to the right side) is again executed on the display screen 204, the display switching unit 113 can further swipe in the SNS application 123 of a kind different from that of the SNS application 123 displayed on the display screen 204.

As above, in the drive-mode application 1, the crew member of the vehicle can execute switching between applications to be displayed on the display 24 by only executing a swiping operation through the touch panel 241, and, also in a case when the application switched over once is to be returned to the origin, it is sufficient for the crew member of the vehicle to execute a swiping operation in the opposite direction through the touch panel 241. For this reason, the display 24 does not need to be visually recognized unlike an icon operation, switching between applications can be intuitively executed, whereby change of viewpoint during driving can be suppressed.

In case of FIG. 7, while the number of the sub applications to be switched to from the base application is two on each of the left and right sides, the number of sub applications may be further increased. While the display switching of a case when the number of sub applications is increased may be arbitrarily executed, an example thereof is illustrated in FIGS. 5 and 8A to 8C.

In case of FIG. 7, while an application to be displayed on the display 24 is switched based on a horizontal swiping operation, in case of FIG. 5, an application to be displayed on the display 24 is switched based on a vertical swiping operation in addition to a horizontal swiping operation.

As illustrated in FIG. 5, on the display screen 201, the base application is displayed on the entire face of the display 24. On this display screen 201, when a horizontal swiping operation is executed, the display of the display 24 is switched to the display screens 202 and 204. This point is as illustrated in FIG. 7.

On the other hand, on this display screen 201, when a vertical swiping operation, for example, a swiping operation of moving a finger brought into contact with the touch panel 241 to the lower side is executed, the display of the display 24 is switched from the display screen 201 to a display screen 211. In other words, the sub application 3 (for example, a navigation auxiliary application) is displayed on the upper side of the display 24, and the navigation application that is the base application is displayed in the remaining area of the screen. Similarly, on this display screen 201, when a swiping operation moving a finger brought into contact with the touch panel 241 to the upper side is executed, the display of the display 24 is switched from the display screen 201 to the display screen 212, and the sub application 4 (for example, an information application) is displayed on the lower side of the display 24, and the navigation application that is the base application is displayed in the remaining area of the screen.

In this way, by switching the application to be displayed on the display 24 based on a vertical swiping operation in addition to a horizontal swiping operation, switching among a maximum of four sub applications can be executed from the display screen 201.

While details will be described next, in a case when a plurality of mutually-different navigation auxiliary applications (sub application 3) are set, when a swiping operation further moving the finger brought into contact with the touch panel 241 to the lower side is executed on the display screen 211, the display switching unit 113 can further swipe in a navigation auxiliary application (sub application 3) of a different kind.

Similarly, in a case when a plurality of mutually-different information applications (sub application 4) are set, when a swiping operation further moving the finger brought into contact with the touch panel 241 to the upper side is executed on the display screen 212, the display switching unit 113 can further swipe in an information application (sub application 4) of a different kind.

Another method for swiping in a plurality of sub applications will be described in detail with reference to FIG. 8A. Here, as illustrated in FIG. 3B, it is assumed that a plurality of music applications 122 (sub application 1) are set in advance by a user by using an application setting screen. FIG. 8A illustrates a concept of swiping in, for example, the remaining music applications 122B and 122C as a crew member of the vehicle further executes the swiping operation 301 (from the right side to the left side) through the touch panel 241 in a state in which the music application 122A (sub application 1) is displayed on the right side (corresponding to the display screen 202 illustrated in FIG. 7).

In the state (the display screen 202 illustrated in FIG. 7) in which a music application 122A (sub application 1) is displayed on the right side, when the crew member of the vehicle further executes the swiping operation 301 (from the right side to the left side) through the touch panel 241, the display switching unit 113 swipes in the sub application 1 of a kind different from that of the music application 122A displayed on the display screen 202 among the plurality of music applications 122, for example, a music application 122B. By doing so, on the display screen, the music application 122B (sub application 1) is displayed on the right side of the display 24, and the navigation application 121 (base application) is displayed in the other area (remaining area) as it is. By configuring as such, switching among arbitrary sub applications of a plurality of kinds can be executed. In a case when a plurality of sub applications are assigned to the swiping operation, when the switching is executed, it is preferable to generate an identification sound from a speaker (not illustrated in the drawing). For example, it may be configured so that a first sub application generates a sound "PI", a second sub application generates a sound "PIPI", and a third sub application generates a sound "PIPIPI".

In the state in which the navigation application 121 (base application) is displayed on the display screen 201, for example, in a case when three kinds of music application 122 are swiped in as the crew member of the vehicle executes the swiping operation 301 (from the right side to the left side) through the touch panel 241, the display switching unit 113 may set to swipe in the music application 122 (sub application 1) that has been lately used by the user first in advance. In addition, in a case when the crew member of the vehicle further executes the swiping operation 301 (from the right side to the left side) through the touch panel 241, the display switching unit 113 may be set in advance to determine the music applications 122 (sub applications) to be swiped in second and after that based on the use frequencies of music applications 122 (sub applications) used by the user in the past.

In the state in which the navigation application 121 (base application) is displayed on the display screen 201, for example, in a case when three kinds of music application 122 are swiped in as the crew member of the vehicle executes the swiping operation 301 (from the right side to the left side) through the touch panel 241, it may be configured so that switching to the music application 122 (sub application 1) that has been lately used by the user as the music application 122 (sub application 1) to be swiped in first is executed, and the display switching unit 113 is set to determine the music applications to be swiped in thereafter based on the use frequencies of the music applications 122 (sub applications 1) used by the user in the past.

As above, in the state in which the navigation application 121 (base application) is displayed on the display screen 201, for example, in a case when three kinds of music application 122 (sub applications 1) are swiped in as the crew member of the vehicle executes the swiping operation 301 (from the right side to the left side) through the touch panel 241, the user may set in advance a selection criterion regarding which music application 122 (sub application 1) will be selected and swiped in first among the plurality of music applications 122 (sub applications 1) and which music applications 122 (sub applications 1) will be selected and swiped in second and after that.

Also in a case when a plurality of SNS applications 123 (sub applications 2) are set in advance by the user using the application setting screen, similar to the case described above, the another method for swiping in a plurality of sub applications may be applied. In other words, in the state in which the navigation application 121 (base application) is displayed on the display screen 201, for example, in a case when three kinds of SNS application 123 (sub application 2) are swiped in as the crew member of the vehicle executes the swiping operation 301 (from the left side to the right side) through the touch panel 241, the method described above may be applied.

In such a case, by rephrasing "music application 122 (sub application 1)", "swiping operation 301 (from the right side to the left side", "state (the display screen 202 illustrated in FIG. 7) in which the music application 122A (sub application 1) is displayed on the right side", and "music applications 122B and 122C" in the description presented above respectively with "SNS application 123 (sub application 2)", "swiping operation 302 (from the left side to the right side", "state (the display screen 204 illustrated in FIG. 7) in which the SNS application 123A (sub application 2) is displayed on the left side", and "SNS applications 123B and 123C", another method for swiping in the plurality of SNS applications 123 (sub applications 3) from the left side to the right side can be described.

As illustrated in FIG. 5, in a case when a plurality of sub applications 3 drawn on the upper side of the display 24 are set, in a case when a swiping operation moving a finger brought into contact with the touch panel 241 in the vertical direction of the display screen 201, for example, from the upper side to the lower side is executed, similar to the description presented above, the other method for swiping in the plurality of sub applications 3 may be applied.

In such a case, by rephrasing "music application 122 (sub application 1)", "swiping operation 301 (from the right side to the left side", "state (the display screen 202 illustrated in FIG. 7) in which the music application 122A (sub application 1) is displayed on the right side", and "music applications 122B and 122C" in the description presented above respectively with "sub application 3A", "swiping operation (from the upper side to the lower side)", "state in which the sub application 3 is displayed on the upper side", and "sub applications 3B and 3C", the other method for swiping in the plurality of sub applications 3 from the upper side to the lower side can be described.

Similarly, as illustrated in FIG. 5, in a case when a plurality of sub applications 4 drawn on the lower side of the display 24 are set, in a case when a swiping operation moving a finger brought into contact with the touch panel 241 in the vertical direction of the display screen 201, for example, from the lower side to the upper side is executed, similar to the description presented above, the other method for swiping in the plurality of sub applications may be applied.

In such a case, by rephrasing "music application 122 (sub application 1)", "swiping operation 301 (from the right side to the left side", "state (the display screen 202 illustrated in FIG. 7) in which the music application 122A (sub application 1) is displayed on the right side", and "music applications 122B and 122C" in the description presented above respectively with "sub application 4A", "swiping operation (from the lower side to the upper side)", "state in which the sub application 4 is displayed on the lower side", and "sub applications 4B and 4C", the other method for swiping in the plurality of sub applications 4 from the lower side to the upper side can be described.

Next, the shape (the shape of a widget) of the music application 122 (sub application 1) drawn on the right side of the navigation application 121 (base application) will be described with reference to FIG. 8B. The widget has a shape of which a part forms a part of a circle on the side that is not in contact with the side face of the screen. This "side" forms a circle having a constant radius from a position located near the center of the screen. The position located near the center of the screen represents the position of the user's own vehicle. The reason for this is that it is preferable for the user to constantly acquire neighboring information (roads, traffic congestion, and facilities) in a certain range from the position of the user's own vehicle, and, in order to prevent the information from being hidden by the widget, such a shape of the widget is employed.

A modified example of FIG. 8B will be described with reference to FIG. 8C. In the example illustrated in FIG. 8C, the position of the user's own vehicle is not located near the center of the screen, but the center point is shifted to the lower side of the screen. In a car navigation application, there are many cases where a function (so-called "heading up") for displaying the driving direction of the user's own vehicle upward on the map is included. In a case when the heading up function is employed, in order to present more map data in the driving direction to the user, the position of the user's own vehicle is shifted from the center of the screen to the lower side. FIG. 8C illustrates the shape of a widget of such a case.

Figure 8B:
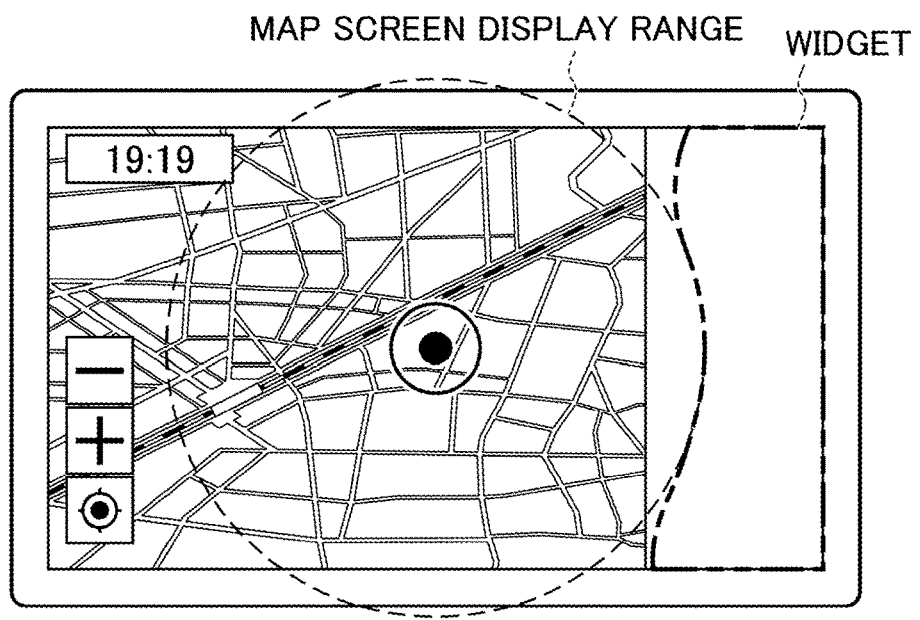
FIG. 8B is a diagram that illustrates the shape of a widget of a sub application drawn on the right side of a navigation application in which an icon representing the position of the user's own vehicle is displayed at the center.
Figure 8C:
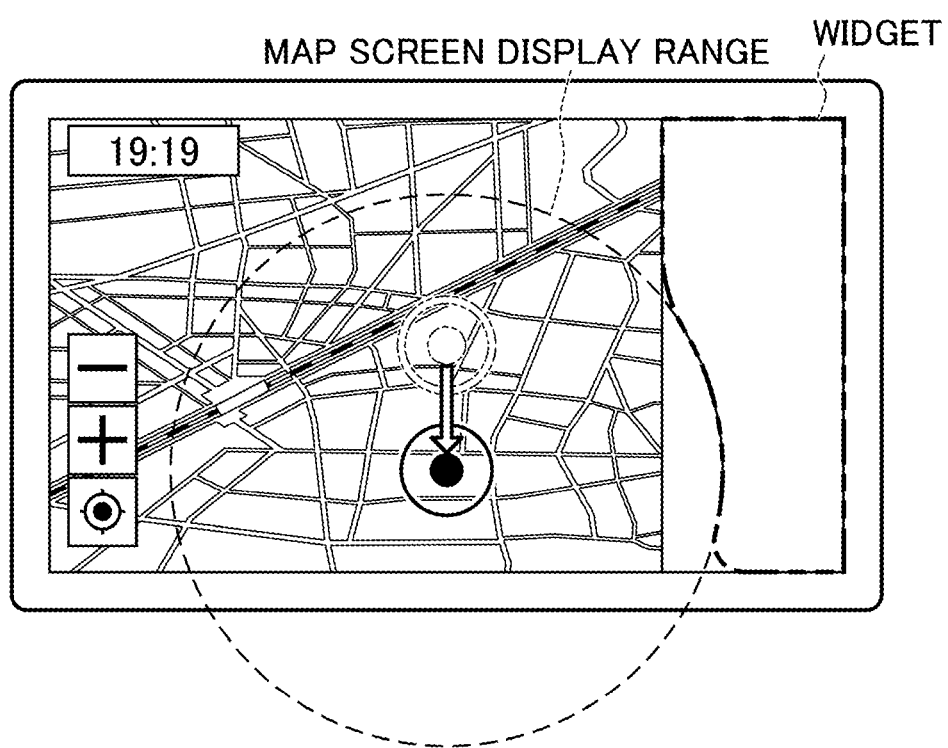
FIG. 8C is a diagram that illustrates the shape of a widget of a sub application drawn on the right side of a navigation application in which an icon representing the position of the user's own vehicle is displayed on the lower side of the screen.

Also in the case of FIG. 8B and in the case of FIG. 8C, there is no change in determining the shape of the widget so that a certain range of a circle from the position of the user's own vehicle is not blocked. In addition, also in a sub application displayed on the left side, similarly, the shape of the widget is determined not to block a certain range of a circle from the position of the user's own vehicle. As the shape of the widget, for example, a concave shape for which neighboring information (roads, traffic congestion, and facilities) within a certain range from the position of the user's own vehicle can be constantly acquired may be used.

As above, while the shape (the shape of the widget) of the music application 122 (sub application) drawn on the right side of the navigation application 121 (base application) has been described with reference to FIGS. 8B and 8C, similarly, also for the shape (the shape of the widget) of the SNS application 123 (sub application) drawn on the left side of the navigation application 121 (base application), the shape of the widget may be determined not to block a certain range of a circle from the position of the user's own vehicle.

By referring to FIG. 5, also for the shape of the sub application 3 drawn on the upper side of the display 24 in a case when a swiping operation in the vertical direction of the display screen 201, for example, a swiping operation moving a finger brought into contact with the touch panel 241 from the upper side to the lower side is executed, similarly, the shape of the widget may be determined not to block a certain range of a circle from the position of the user's own vehicle.

In addition, also for the shape of the sub application 3 drawn on the lower side of the display 24 in a case when a swiping operation moving a finger brought into contact with the touch panel 241 from the lower side to the upper side is executed on the display screen 201, similarly, the shape of the widget may be determined not to block a certain range of a circle from the position of the user's own vehicle.

According to the drive-mode application 1 using the other method of display switching executed by the display switching unit 113 according to the first embodiment described above, the following effects are acquired.

At the normal time when there is no connection to a vehicle, the function restricting unit 112 controls the operations of applications in the first control. On the other hand, when the connection detecting unit 111 detects a connection between the information terminal 50 and a vehicle, when a user's operation is received in addition to the detection made by the connection detecting unit 111, or when the vehicle is detected to be in the course of being driven in addition to the detection made by the connection detecting unit 111, the function restricting unit 112 controls the operations of the applications in the second control other than the first control.

In this way, operations and the like not desirable during driving of the vehicle can be appropriately prohibited, and the information terminal 50 including the touch panel 241 mounted in the vehicle can be operably controlled without influencing driving.

In the control process according to the second control, the function restricting unit 112 restricts some of user's operations that can be accepted in the first control and restricts some of applications that can be operated in the first control.

Accordingly, an operation (for example, inputting a text) or an application (for example, reproduction of a moving image) requiring the display 24 being watched can be prohibited when there is a connection to a vehicle, and the information terminal 50 including the touch panel 241 mounted on the vehicle can be operably controlled without influencing driving.

In addition, the display switching unit 113 executes switching among the kinds of application to be displayed on the display 24 of the information terminal 50 based on a swiping operation, which is executed in a first direction, received through the touch panel 241.

Accordingly, switching among applications can be intuitively executed, and there is no influence on driving.

In a case when the swiping operation 301 (from the right side to the left side) is received on the display screen 201 displaying the base application on the entire face, the display switching unit 113 switches the display of the display 24 to the display screen 202 displaying the base application and the sub application 1. Then, on the display screen 202, in a case when an operation of tapping (pressing) the entire screen display button 1221 displayed on the sub application is received, the display switching unit 113 switches the display to the display screen 203 displaying the sub application 1 on the entire face and, in a case when the swiping operation 302 (from the left side to the right side) is received, the display switching unit 113 switches the display to the display screen 201 displaying the base application on the entire face.

Accordingly, the switching to the base application having a high use frequency during driving can be executed intuitively and easily, and change of viewpoint during driving can be suppressed.

The shape of the widget that is the sub application is formed not to block a certain range of a circle from the position of the user's own vehicle displayed in the navigation application 121 that is the base application, and accordingly, neighboring information (roads, traffic congestion, and facilities) within a certain range from the position of the user's own vehicle can be constantly acquired by the user.

Second Embodiment

Subsequently, a second embodiment of the present invention will be described with reference to the drawings. While switching among applications to be displayed on the display 24 has been described in the first embodiment, in the second embodiment, the operation of an application displayed on the display 24 will be described. The same reference numeral is assigned to the same configuration as that of the first embodiment, and description thereof will not be presented.

Structure of Drive-Mode Application 1A

Figure 9:
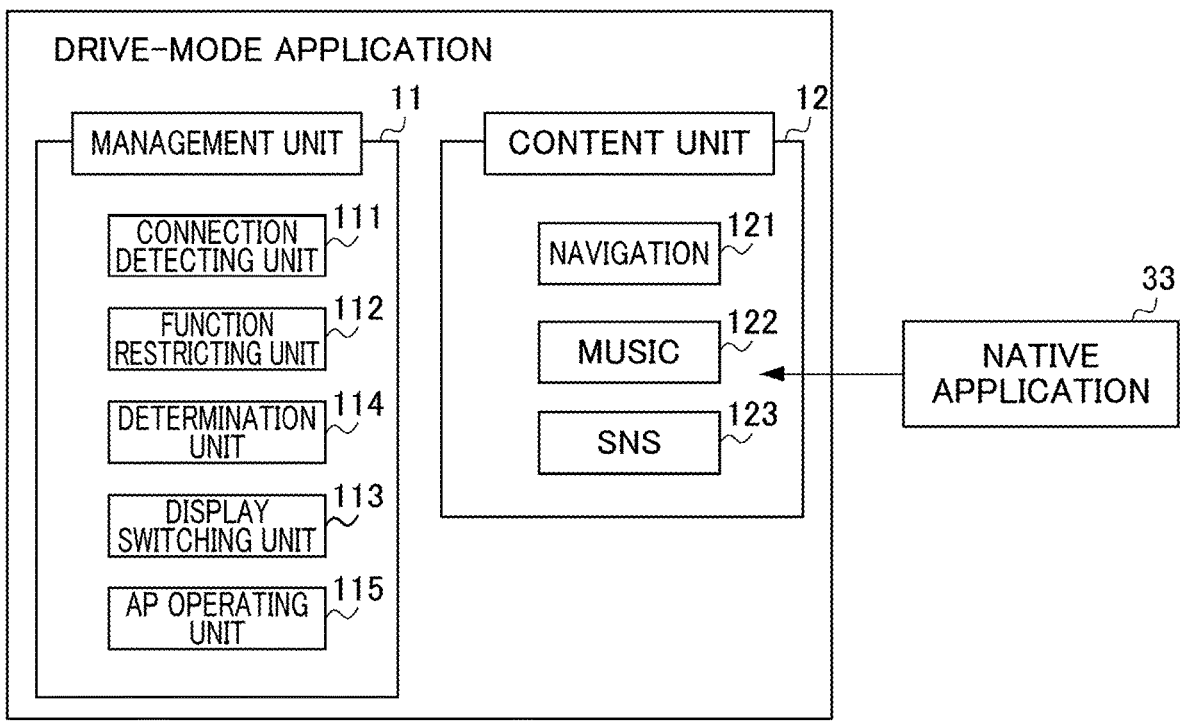
FIG. 9 is a diagram that illustrates the structure of a drive-mode application according to a second embodiment.

FIG. 9 is a diagram that illustrates the structure of a drive-mode application 1A according to the second embodiment. The drive-mode application 1A according to the second embodiment is configured to include a determination unit 114 and an AP operating unit 115 in addition to the drive-mode application 1 according to the first embodiment.

In other words, the information terminal 50 executes the management unit 11, thereby causing the CPU 21 to function as the determination unit 114 and the AP operating unit 115 in addition to the connection detecting unit 111, the function restricting unit 112, and the display switching unit 113.

In addition, the information terminal 50 executes the management unit 11, thereby causing the CPU 21 to execute a method of controlling an application including a determination step and an AP operating step in addition to the connection detecting step, the function restricting step, and the display switching step.

Hereinafter, the determination unit 114 and the AP operating unit 115 serving as functioning means included in the information terminal 50 by executing the management unit 11 will be described. In addition, the determination step and the AP operating step included in the method of controlling an application that is executed by the information terminal 50 by executing the management unit 11 can be described by replacing "unit" with "step", and thus the description will not be presented.

The determination unit 114 determines whether an operation of a user (a crew member of a vehicle) received through the touch panel 241 is a single touch or a multi-touch. Here, the single touch represents an operation having only one contact point on the touch panel 241, and, for example, an operation in a case when the touch panel 241 is operated using one finger corresponds thereto. In addition, the multi-touch represents an operation having two or more contact points on the touch panel 241, and, for example, an operation in a case when the touch panel 241 is operated using two fingers corresponds thereto.

Figure 10A:
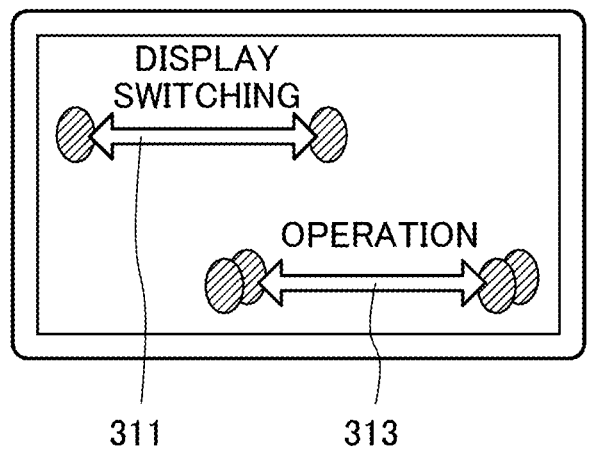
FIG. 10A is a diagram that illustrates the relationship between application switching and the operation of an application.

In the drive-mode application 1A according to the second embodiment, the control of an application is configured to be different based on whether the operation of the crew member of the vehicle is a single touch or a multi-touch. In other words, as illustrated in FIG. 10A, in the case of a single touch, switching among applications executed by the display switching unit 113 is executed. On the other hand, in the case of a multi-touch, an operation of an application that is executed by the AP operating unit 115 is executed.

Thus, in a case when a single touch is determined by the determination unit 114, the display switching unit 113 executes switching between the kinds of application to be displayed on the display 24 based on a swiping operation received through the touch panel 241. The display switching executed by the display switching unit 113 is the same as that of the first embodiment, and thus, a detailed description thereof will not be presented.

On the other hand, in a case when a multi-touch is determined by the determination unit 114, the AP operating unit 115 operates an application displayed on the display 24 based on a swiping operation received through the touch panel 241. In addition, the operation content of the application is arbitrarily set according to the kind of the application. For example, scrolling of the display position in the case of the navigation application 121 and searching in a musical piece that is being played or switching a musical piece that is being played to the next musical piece in the case of the music application 122 are examples thereof.

In this way, only by executing an intuitive operation that is a swiping operation for the touch panel 241, the switching among applications and operation of the application can be executed. In the case of FIG. 10A, both the switching among applications and the operation of an application are executed through a horizontal swiping operation, and accordingly, switching and operation are determined based on whether the touch is a single touch or a multi-touch. In this point, in a case when switching and operation can be determined based on the content of a swiping operation, the switching among applications and the operation of an application may be executed regardless of a single touch or a multi-touch.

Figure 10B:
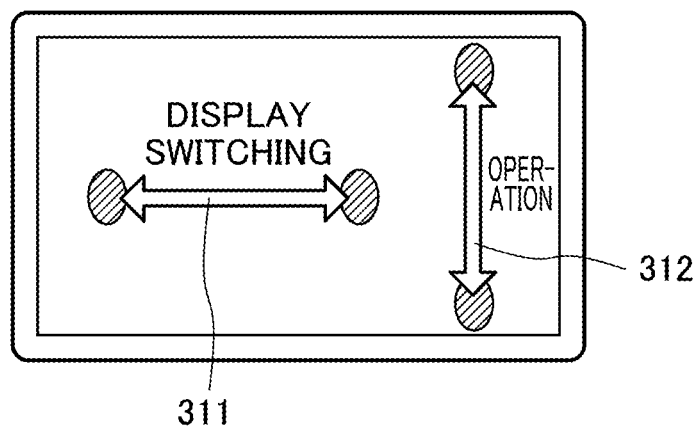
FIG. 10B is a diagram that illustrates the relationship between application switching and the operation of an application.

As the determination based on the content of the swiping operation, for example, a determination according to a swiping operation executed in a first direction and a swiping operation executed in a second direction intersecting the first direction may be considered in a case when the switching among applications is executed only by the swiping operation executed in the first direction. More specifically, as illustrated in FIG. 10B, switching among applications is executed only by a swiping operation executed in the horizontal direction, and the operation of an application is executed in a swiping operation executed in the vertical direction.

Relation Between Display Switching and Active Application

There are cases when the display switching unit 113 of the drive-mode application 1A displays a plurality of applications on the display 24. From this point, in a case when an application is operated through an intuitive operation that is a swiping operation, an application (active application) that is the operation target needs to be appropriately determined.

Figure 11:
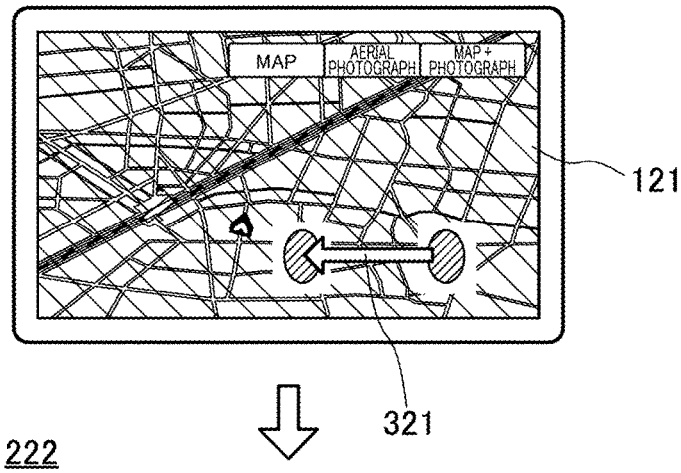
FIG. 11 is a diagram that illustrates the relationship between display switching executed by a display switching unit and an active application.
Figure 11:
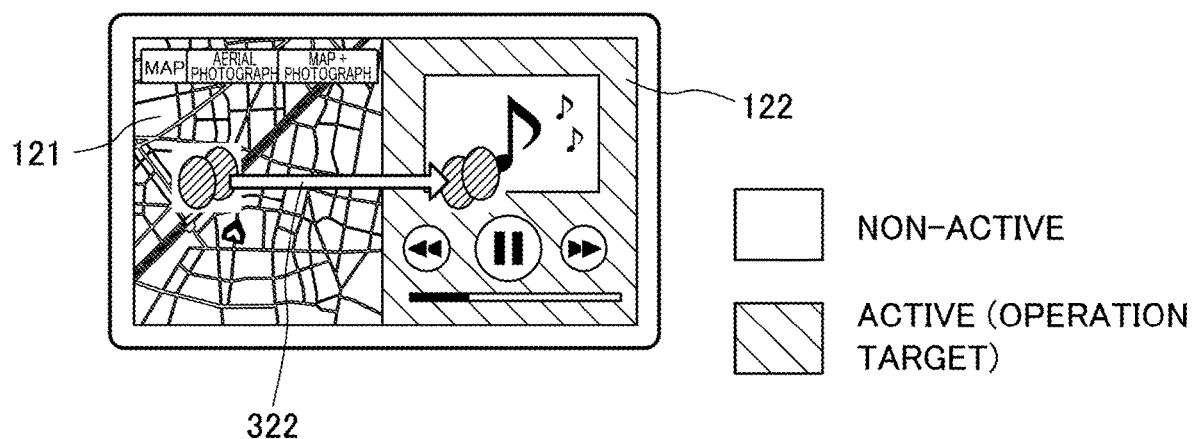

Thus, the relation between the display switching executed by the display switching unit 113 and the active application will be described with reference to FIG. 11.

On a display screen 221, the navigation application 121 is displayed on the entire face of the display 24. Since only one application is displayed on the display 24, on the display screen 221, the navigation application 121 is the active application. In other words, when a multi-touch swiping operation is executed on the display screen 221, the AP operating unit 115 operates the navigation application 121.

On the display screen 221, when a single touch swiping operation 321 is executed, the display switching unit 113 switches the display of the display 24 from the display screen 221 to a display screen 222. On this display screen 222, the navigation application 121 is displayed on the left half face of the display 24, and the music application 122 is displayed on the right half face. On this display screen 222, the music application 122 becomes the active application. In other words, when a multi-touch swiping operation 322 is executed on the display screen 222, the AP operating unit 115 operates the music application 122.

In this way, in a case when display switching is executed by the display switching unit 113, a new application displayed by the display switching unit 113 becomes the active application.

Accordingly, the crew member of the vehicle does not need to be aware of the starting position of the swiping operation for operating the application and thus can execute an operation of the application only through an intuitive operation without changing line of sight to the display 24.

According to the drive-mode application 1A of the second embodiment described above, the following effects are acquired.

In a case when the user's operation received through the touch panel 241 is a single touch, the display switching unit 113 executes switching between applications displayed on the display 24. On the other hand, in the case of a multi-touch, the AP operating unit 115 operates the application displayed on the display 24.

In this way, the user can execute switching among applications and an operation of the application by only executing an intuitive operation, thus, does not need to visually recognize the display 24, and can operably control the information terminal 50 including the touch panel 241 mounted in the vehicle without influencing driving.

At this time, in a case when a swiping operation (from the right side to the left side) is received on the display screen displaying the base application on the entire face, the display switching unit 113 switches the display of the display 24 to a display screen displaying the base application and the sub application 1. Then, in a case when a swiping operation (from the right side to the left side) is received on this display screen, the display switching unit 113 switches the display to a display screen displaying the sub application 1 on the entire face. In a case when a swiping operation (from the left side to the right side) is received, the display switching unit 113 switches the display to a display screen displaying the base application on the entire face.

In this way, the switching of the display to the base application, which has a high use frequency during driving, can be executed intuitively and easily, and change of viewpoint during driving can be suppressed.

In a case when a plurality of applications are displayed on the display 24, when a swiping operation for operating an application is received, the AP operating unit 115 executes an operation for a new application that is displayed by the display switching unit 113.

Accordingly, the crew member of the vehicle does not need to be aware of the starting position of the swiping operation for operating the application and thus can execute an operation of the application only through an intuitive operation without changing line of sight to the display 24, whereby change of viewpoint during driving can be suppressed.

Another Method of Operating Application Displayed on Display 24 in Second Embodiment Another method of operating an application displayed on the display 24 in the second embodiment will be described with reference to FIGS. 12A, 12B, and 13.

Structure of Drive-Mode Application 1A

The structure of the drive-mode application 1A is the same as that of the second embodiment illustrated in FIG. 9. In other words, the drive-mode application 1A is configured to include a determination unit 114 and an AP operating unit 115 in addition to the drive-mode application 1 according to the first embodiment.

In other words, the information terminal 50 executes the management unit 11, thereby causing the CPU 21 to function as the determination unit 114 and the AP operating unit 115 in addition to the connection detecting unit 111, the function restricting unit 112, and the display switching unit 113.

In addition, the information terminal 50 executes the management unit 11, thereby causing the CPU 21 to execute a method of controlling an application including a determination step and an AP operating step in addition to the connection detecting step, the function restricting step, and the display switching step.

Hereinafter, the determination unit 114 and the AP operating unit 115 serving as functioning means included in the information terminal 50 by executing the management unit 11 will be described. In addition, the determination step and the AP operating step included in the method of controlling an application that is executed by the information terminal 50 by executing the management unit 11 can be described by replacing "unit" with "step", and thus the description will not be presented.

The determination unit 114 determines whether an operation of a user (a crew member of a vehicle) received through the touch panel 241 is a single touch or a multi-touch.

Among a plurality of touch types (for example, a single touch, a simultaneous touch of two places, a simultaneous touch of three places, a multi-touch, and the like), a first type touch and a second type touch may be selected and set in advance. In such a case, the determination unit 114 determines whether an operation of the user (the crew member of the vehicle) received through the touch panel 241 is a first type touch or a second type touch.

Figure 12A:
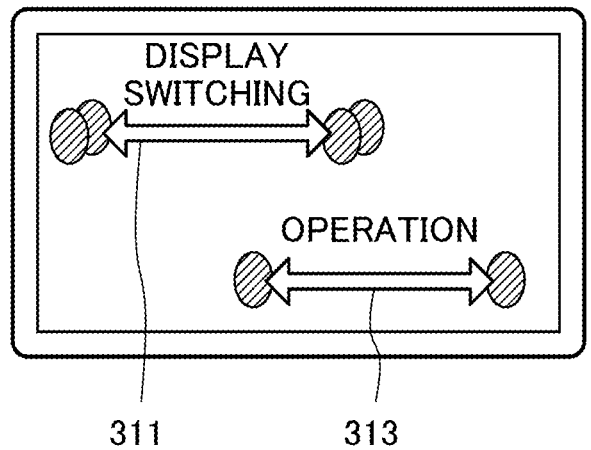
FIG. 12A is a diagram that illustrates the relationship between application switching and the operation of an application according to another method.
Figure 12B:
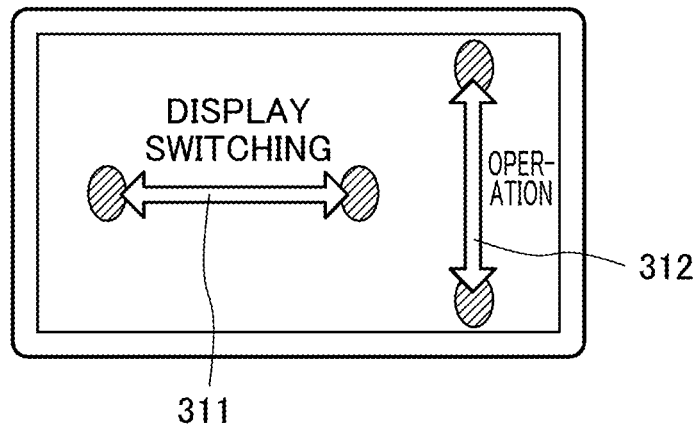
FIG. 12B is a diagram that illustrates the relationship between application switching and the operation of an application according to another method.

In the drive-mode application 1A of another method of operating an application displayed on the display 24 according to the second embodiment, as illustrated in FIG. 12A, switching among applications is executed by the display switching unit 113 in the case of a multi-touch swiping operation, and an operation of an application is executed by the AP operating unit 115 in the case of a single touch swiping operation.

As another embodiment, it may be configured so that switching among applications is executed by the display switching unit 113 in the case of a swiping operation according to a first type touch, and an operation of the application is executed by the AP operating unit 115 in the case of a swiping operation according to a touch of the second type.

In a case when a multi-touch (or a first type touch) is determined by the determination unit 114, the display switching unit 113 executes switching between the types of application to be displayed on the display 24 based on a swiping operation received through the touch panel 241. The display switching executed by the display switching unit 113 is the same as the display switching executed by the display switching unit 113 according to the first embodiment or the another method of display switching executed by the display switching unit 113, and thus detailed description thereof will not be presented.

In a case when a single touch (or a touch of the second type) is determined by the determination unit 114, the AP operating unit 115 executes an operation of an application displayed on the display 24 based on a swiping operation received through the touch panel 241. In addition, the operation content of the application is arbitrarily set according to the kind of the application. For example, scrolling of the display position in the case of the navigation application 121, searching in a musical piece that is being played or switching the musical piece that is being played to a next musical piece in the case of the music application 122, and a transmission destination or message switching in the case of the SNS application 123 are examples thereof. Even a multi-touch may be assigned to an operation of an application other than the swiping operation. For example, the map may be enlarged by executing a multi-touch operation (so-called "pinch out") using two fingers and broadening the space between two points on the navigation application 121, or the map may be reduced by an operation (so-called "pinch in") by narrowing the space between two points.

In this way, only by executing an intuitive operation that is a swiping operation for the touch panel 241, switching among applications and operation of the application can be executed. In the case of FIG. 12A, both switching among applications and operation of an application are executed through a horizontal swiping operation, and accordingly, switching and operation are determined based on whether the touch is a single touch (or a touch of the second type) or a multi-touch (a first type touch). In this point, in a case when switching and operation can be determined based on the content of the swiping operation, switching among applications and operation of an application may be executed regardless of a single touch or a multi-touch.

As the determination based on the content of the swiping operation, for example, a determination according to a swiping operation executed in a first direction and a swiping operation executed in a second direction intersecting the first direction may be considered in a case when switching among applications is executed only by the swiping operation in the first direction. More specifically, as illustrated in FIG. 12B, switching among applications is executed only by a swiping operation executed in the horizontal direction, and the operation of an application is executed by a swiping operation executed in the vertical direction.

Relation Between Display Switching and Active Application

There are cases when the display switching unit 113 of the drive-mode application 1A displays a plurality of applications on the display 24. From this point, in a case when an application is operated through an intuitive operation that is a swiping operation, the application (active application) that is the operation target needs to be appropriately determined.

Thus, the relationship between the display switching executed by the display switching unit 113 and the active application will be described with reference to FIG. 13.

On a display screen 221, the navigation application 121 is displayed on the entire face of the display 24. Since only one application is displayed on the display 24, on the display screen 221, the navigation application 121 is the active application. In other words, when a single touch swiping operation is executed on the display screen 221, the AP operating unit 115 operates the navigation application 121.

On the display screen 221, when a multi-touch swiping operation 321 is executed, the display switching unit 113 switches the display of the display 24 from the display screen 221 to a display screen 222. On this display screen 222, the music application 122 (sub application 1) is displayed on the right side of the display 24, and the navigation application 121 (base application) is displayed in the other area (remaining area) as it is. In other words, for the user, visually, the music application 122 (sub application) is depicted to be superimposed on the navigation application 121 (base application). On this display screen 222, the music application 122 becomes the active application. In other words, when the single touch swiping operation 322 is executed on the display screen 222, the AP operating unit 115 operates the music application 122. When the entire screen display button 1221 arranged on the music application 122 is tapped (pressed), the display switching unit 113 switches the display of the music application 122 of the display 24 from the display screen 222 to an entire screen display.

In this way, in a case when display switching is executed by the display switching unit 113, a new application displayed by the display switching unit 113 becomes the active application. In other words, for the user, visually, the music application 122 (sub application) is depicted to be superimposed on the navigation application 121 (base application). On this display screen 222, the music application 122 becomes the active application.

Accordingly, the crew member of the vehicle does not need to be aware of the starting position of the swiping operation for operating the application and thus can execute operation of the application only through an intuitive operation without changing line of sight to the display 24.

Figure 13:
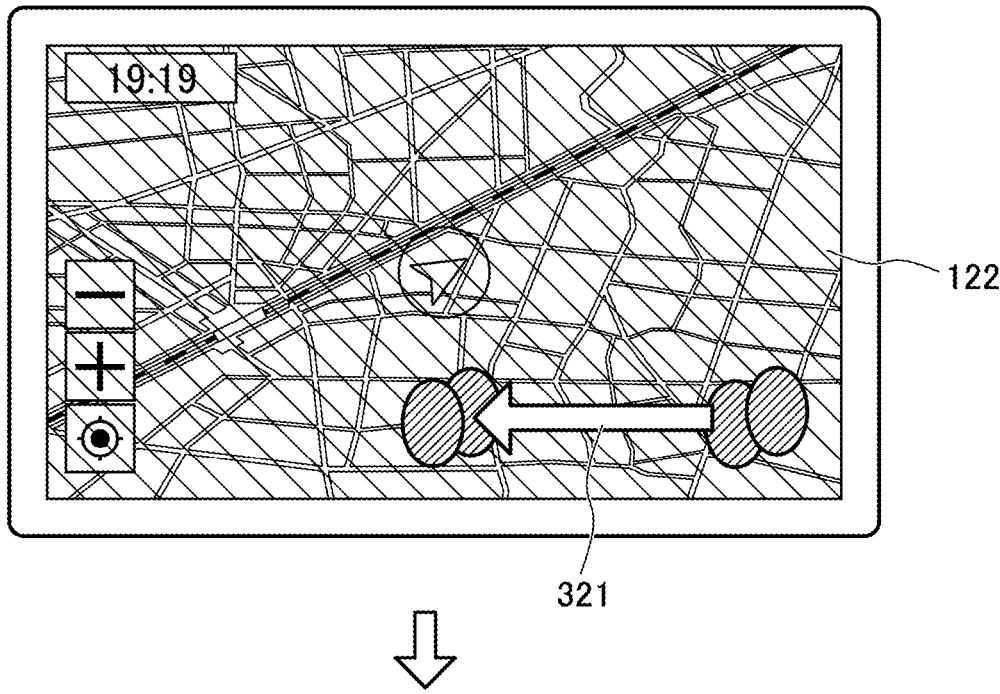
FIG. 13 is a diagram that illustrates the relationship between display switching executed by a display switching unit and an active application according to another method.
Figure 13:
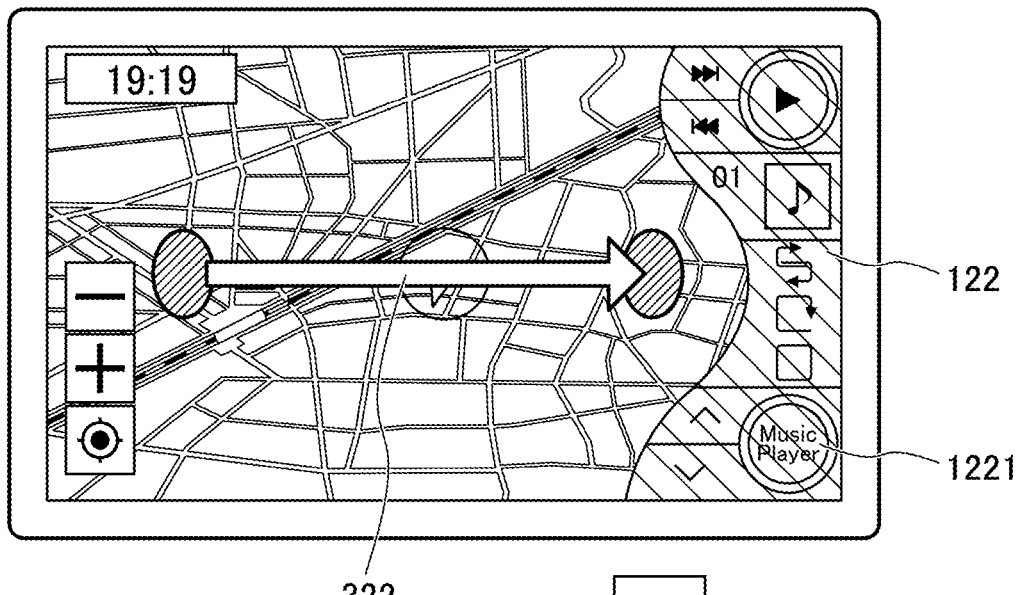

With reference to FIG. 13, an active application in a case when the display switching unit 113 switches the display of the display 24 from the display screen 221 to the display screen 222 on which the music application 122 (sub application 1) is displayed on the right side of the display 24, and the navigation application 121 (base application) is displayed in the other area (remaining area) as it is has been described.

The description presented above can be similarly applied to an active application in a case when the display is switched to display the SNS application 123 (sub application 2) on the left side of the display 24. In other words, for the user, visually, the SNS application 123 (sub application 2) is depicted to be superimposed on the navigation application 121 (base application). On this display screen, the SNS application 123 (sub application 2) becomes the active application.

Similarly, the description can be similarly applied to an active application in a case when the display is switched to display the sub application 3 on the upper side of the display 24.

In other words, for the user, visually, the sub application 3 is depicted to be superimposed on the navigation application 121 (base application). On this display screen, the sub application 3 becomes the active application.

Similarly, the description can be similarly applied to an active application in a case when the display is switched to display the sub application 4 on the lower side of the display 24.

In other words, for the user, visually, the sub application 4 is depicted to be superimposed on the navigation application 121 (base application). On this display screen, the sub application 4 becomes the active application.

According to the drive-mode application 1A using the other method of operating an application displayed on the display 24 according to the second embodiment, the following effects are acquired.

In a case when the user's operation received through the touch panel 241 is a multi-touch, the display switching unit 113 executes switching between applications to be displayed on the display 24. On the other hand, in the case of a single touch, the AP operating unit 115 executes an operation of an application displayed on the display 24.

In this way, the user can execute switching among applications and operation of the application by only executing an intuitive operation, thus, does not need to visually recognize the display 24, and can operably control the information terminal 50 including the touch panel 241 mounted in the vehicle without influencing driving.

In a case when a swiping operation (from the right side to the left side) is received on the display screen displaying the base application on the entire face, the display switching unit 113 switches the display of the display 24 to a display screen displaying the base application and the sub application 1. Then, on this display screen, the entire screen display button arranged on the sub application 1 is tapped (pressed), the display switching unit 113 switches the display to a display screen displaying the sub application 1 on the entire face, and, in a case when a swiping operation (from the left side to the right side) is received, the display switching unit 113 switches the display to a display screen displaying the base application on the entire face.

Accordingly, the switching to the base application having a high use frequency during driving can be executed intuitively and easily, and change of viewpoint during driving can be suppressed.

In a case when a plurality of applications are displayed on the display 24, when a swiping operation for operating an application is received, the AP operating unit 115 executes an operation for a new application that is displayed by the display switching unit 113.

Accordingly, the crew member of the vehicle does not need to be aware of the starting position of the swiping operation for operating the application and thus can execute an operation of the application only through an intuitive operation without changing line of sight to the display 24, whereby change of viewpoint during driving can be suppressed.

As above, while preferred embodiments of the drive-mode applications 1 and 1A of the present invention have been described, the present invention is not limited to the embodiments described above but may be appropriately changed.

For example, in the embodiment described above, as an example of the user's operation restricted in the second control by the function restricting unit 112, an operation such as text inputting that is complicated and requires the display 24 being watched has been described. In this point, the function restricting unit 112 may restrict operations (for example, tap, double-tap, pinch in, pinch out, and the like) other than the swiping operation in the second control. More specifically, the determination unit 114 determines whether or not the operation of the user (a crew member of the vehicle) received through the touch panel 241 is a swiping operation. Then, in a case when the determination unit 114 determines an operation other than the swiping operation, the function restricting unit 112 may invalidate the operation.

In addition, according to such a configuration, only the swiping operation is permitted to the crew member of the vehicle, and thus, the crew member of the vehicle does not visually recognize the display 24 and has a remarkably restricted content to be operated. Thus, for example, it may be configured so that an operation area for an operation other than the swiping operation is arranged in a part of the screen, and an operation that does not respond to only the swiping operation is executed based on an operation in the operation area. In other words, when the connection detecting unit 111 detects a connection between the information terminal 50 and a vehicle, a predetermined operation area is arranged on the touch panel 241. Then, it is determined whether an operation of the user (the crew member of the vehicle) received through the touch panel 241 is an operation executed in the predetermined operation area. Then, in a case when the determination unit 114 determines an operation executed in the predetermined operation area, the function restricting unit 112 validates an operation other than the swiping operation as well and executes predetermined control based on the operation. On the other hand, in a case when the determination unit 114 determines not an operation executed in the predetermined operation area, the function restricting unit 112 validates only the swiping operation and executes predetermined control.

In the embodiment described above, the starting point of the swiping operation is not particularly described. In this point, the swiping operation may have an arbitrary position on the display 24 as a starting point. In addition, a swiping operation may be received as the swiping operation only in a case when a predetermined area located near the frame of the display 24 is the starting point. Regardless of a level difference such as a frame near a frame portion of the display 24, the user can recognize the frame portion by touching it using the hand without visually recognizing the information terminal 50. Accordingly, an erroneous operation can be prevented while a sufficient swiping amount is secured. Thus, it is effective to receive a swiping operation only in a case when a predetermined area of the frame portion is the starting point. Thus, the determination unit 114 determines whether or not the starting point of the swiping operation is inside the predetermined area. The function restricting unit 112 may validate the swiping operation in a case when the starting point of the swiping operation is determined to be inside the predetermined area by the determination unit 114 and invalidate the swiping operation in a case when the starting point of the swiping operation is determined not to be inside the predetermined area by the determination unit 114.

For example, in the embodiment described above illustrated in FIGS. 4 and 6, a horizontal swiping operation has been described as an example of the "swiping operation executed in the first direction" and the "swiping operation executed in the second direction, which is the direction opposite to the first direction". In this point, the "swiping operation executed in the first direction" and the "swiping operation executed in the second direction, which is the direction opposite to the first direction" may be vertical swiping operations.

In addition, the swiping operation may be changed to a swiping operation used for operating an application, and the application may be operated by analyzing various selections and instructions made by the crew member of the vehicle input through a microphone (not illustrated in the drawing) using a speech recognition technology.

In the embodiment described above, while a smartphone or a tablet terminal has been described as the information terminal 50, the information terminal 50 is not limited thereto. The present invention can be applied to various devices such as a PND (personal navigation device), a PDA (personal digital assistant), a gaming device, an in-vehicle navigation device, and a personal computer.

In addition, the present invention may be mainly executed by hardware using a constituent element such as an application-specific integrated circuit ("ASIC") or a field programmable gate array ("FPGA"). Furthermore, the present invention may be executed using a combination of both hardware and software.

It may be configured so that a program used for realizing the function of the information terminal 50 is recorded in a computer-readable recording medium, and the program recorded in the recording medium is read and executed by a computer system so as to realize the function.

Here, the "computer system" is assumed to include an OS and hardware, such as peripheral devices. In addition, the "computer-readable recording medium" represents a portable medium such as a flexible disk, a magneto-optical disk, a ROM, or a CD-ROM or a storage device, such as a hard disk built in the computer system.

As above, while the preferred embodiments have been described, the present invention can be executed in various forms without being limited to the embodiments described above. The effects described in the embodiment described above are only enumerations of preferred effects acquired from the present invention, and the effects according to the present invention are not limited to those described above.

EXPLANATION OF REFERENCE NUMERALS

1, 1A . . . Drive-mode application, 11 . . . Management unit, 111 . . . Connection detecting unit, 112 . . . Function restricting unit, 113 . . . Display switching unit, 114 . . . Determination unit, 115 . . . AP operating unit, 12 . . . Content unit, 121 . . . Navigation application, 122 . . . Music application, 123 . . . SNS application, 50 . . . Information terminal, 1221 . . . Entire screen display button of music application, 1231 . . . Entire screen display button of SNS application

The invention claimed is:

1. A computer-readable non-transitory storage medium storing a program that causes a computer controlling operations of applications based on a user's operation received through a touch panel to function as:
    a determination unit determining whether or not the user's operation received through the touch panel is a swiping operation;
    a function restricting unit invalidating the user's operation in case when the operation is determined not to be the swiping operation by the determination unit so as not to allow functioning, as an error; and
    a display switching unit executing switching an active application to be displayed on the display device of the computer, from an application being displayed on the display device to another application, based on the swiping operation in a case when the operation is determined to be the swiping operation by the determination unit, wherein the display switching unit switches the entire face of the display device to display another application based on a second time swiping operation.

2. The computer-readable non-transitory storage medium storing a program according to claim 1, wherein the program causes the computer to function to validate the swiping operation only in a case when the swiping operation is a swiping operation having a starting point positioned near an edge of the display device as the function restricting unit.

3. The computer-readable non-transitory storage medium storing a program according to claim 1, wherein the program further causes the computer to function:
    to determine whether or not the user's operation received through the touch panel is an operation executed in a predetermined area disposed in a part of the touch panel as the determination unit; and
    to validate the operation regardless of a content of the operation in a case when the user's operation is determined to be an operation executed in the predetermined area by the determination unit and invalidate an operation other than the swiping operation in a case when the user's operation is determined not to be an operation executed in the predetermined area by the determination unit as the function restricting unit.

4. A computer-readable non-transitory storage medium storing a program causing an information terminal controlling operation of applications based on a user's operation received through a touch panel mounted on the display device to function as:
    a display switching unit displaying a first application and a second application having a curved boundary line on a designated radius from a specific position on the first application on the display device based on a user's first type touch swiping operation executed in a first direction that is received through the touch panel in a state in which the first application is displayed on the display device,
    wherein the curved boundary line overall has only a singular partial circular shape which has a singular constant radius from the specific position on the first application,
    wherein the first application is to display the current user's position and its neighboring information on the display device, and
    wherein the specific position on the first application represents the current user's position.

5. The computer-readable non-transitory storage medium storing a program according to claim 4, wherein the program causes the information terminal to function to display the first application on an entire face of the display device in a case when a first type touch swiping operation executed in a second direction that is the direction opposite to the first direction is received in a state in which the first application and the second application are displayed on the display device as the display switching unit.

6. The computer-readable non-transitory storage medium storing a program according to claim 4,
wherein the program further causes the information terminal to function as:
a determination unit determining whether the user's operation received through the touch panel is a first type touch or a second type touch; and
an AP operating unit executing an operation of the application displayed on the display device based on the swiping operation in a case when the user's swiping operation received through the touch panel is determined to be the second type touch by the determination unit,
wherein the program causes the information terminal to function to display the first application and the second application on the display device in a case when the user's swiping operation executed in the first direction received through the touch panel is determined to be the first type touch by the determination unit in a state in which the first application is displayed on the display device as the display switching unit.

7. The computer-readable non-transitory storage medium storing a program according to claim 4, wherein the first type touch is a multi-touch, the first application is an application having a navigation function, and the specific position on the first application is a current position of the information terminal displayed on a map that is displayed.

8. A method of controlling applications that is executed by an information terminal controlling operations of the applications based on a user's operation received through a touch panel mounted on a display device, the method comprising:
a display switching step displayed a first application and a second application having a curved boundary line on a designated radius from a specific position on the first application on the display device based on a user's first type touch swiping operation executed in a first direction that is received through the touch panel in a state in which the first application is displayed on the display device,
wherein the curved boundary line overall has only a singular partial circular shape which has a singular constant radius from the specific position on the first application,
wherein the first application is to display the current user's position and its neighboring information on the display device, and
wherein the specific position on the first application represents the current user's position.

9. The method of controlling applications according to claim 8, wherein the display switching step further includes a step for displaying the first application on an entire face of the display device in a case when a first type touch swiping operation executed in a second direction that is the direction opposite to the first direction is received in a state in which the first application and the second application are displayed on the display device.

10. The method of controlling applications according to claim 8, further comprising:
a determination step determining whether the user's operation received through the touch panel is a first type touch or a second type touch; and
an AP operating step executing an operation of the application displayed on the display device based on the swiping operation in a case when the user's swiping operation received through the touch panel is determined to be the second type touch in the determination step,
wherein the display switching step includes displaying the first application and the second application on the display device in a case when the user's swiping operation executed in the first direction received through the touch panel is determined to be the first type touch in the determination step in a state in which the first application is displayed on the display device.

11. The method of controlling applications according to claim 8, wherein the first type touch is a multi-touch, the first application is an application having a navigation function, and the specific position on the first application is the current position of the information terminal displayed on a map that is displayed.

12. An information terminal comprising:
a display device including a touch panel mounted on the display device; and
a display switching unit displaying a first application and a second application having a curved boundary line on a designated radius from a specific position on the first application on the display device based on a user's first type touch swiping operation executed in a first direction that is received through the touch panel in a state in which the first application is displayed on the display device,
wherein the curved boundary line overall has only a singular partial circular shape which has a singular constant radius from the specific position on the first application,
wherein the first application is to display the current user's position and its neighboring information on the display device, and
wherein the specific position on the first application represents the current user's position.

13. The information terminal according to claim 12, wherein the display switching unit further displays the first application on the entire face of the display device in a case when a first type touch swiping operation executed in a second direction that is the direction opposite to the first direction is received in a state in which the first application and the second application are displayed on the display device.

14. The information terminal according to claim 12, further comprising:
a determination unit determining whether the user's operation received through the touch panel is a first type touch or a second type touch; and
an AP operating unit executing an operation of the application displayed on the display device based on the swiping operation in a case when the user's swiping operation received through the touch panel is determined to be the second type touch by the determination unit,
wherein the display switching unit displays the first application and the second application on the display device in a case when the user's swiping operation executed in the first direction received through the touch panel is determined to be the first type touch by the determination unit in a state in which the first application is displayed on the display device.

15. The information terminal according to claim 12, wherein the first type touch is a multi-touch, the first application is an application having a navigation function, and the specific position on the first application is the current position of the information terminal displayed on the map that is displayed.

\* \* \* \* \*